(12) United States Patent
Zhenduo et al.

(10) Patent No.: US 7,006,900 B2
(45) Date of Patent: Feb. 28, 2006

(54) HYBRID CASCADE MODEL-BASED PREDICTIVE CONTROL SYSTEM

(75) Inventors: Liu Zhenduo, Amersfoort (NL); Frank Huussen, Bilthoven (NL)

(73) Assignee: ASM International N.V., Bilthoven (NL)

( * ) Notice: Subject to any disclaimer, the term of this patent is extended or adjusted under 35 U.S.C. 154(b) by 82 days.

(21) Appl. No.: 10/619,383

(22) Filed: Jul. 14, 2003

(65) Prior Publication Data

US 2004/0098145 A1 May 20, 2004

Related U.S. Application Data

(60) Provisional application No. 60/427,143, filed on Nov. 14, 2002.

(51) Int. Cl.
G05G 23/00 (2006.01)

(52) U.S. Cl. ............................ 700/299; 700/8; 700/29; 700/42; 700/44; 700/50; 219/483; 219/494; 219/497; 165/289; 165/290; 165/291

(58) Field of Classification Search .................... 700/8, 700/21, 29, 42, 50, 79, 299, 44; 219/483, 219/490, 494, 497; 165/279, 287–293
See application file for complete search history.

(56) References Cited

U.S. PATENT DOCUMENTS

| | | | |
|---|---|---|---|
| 3,567,895 A * | 3/1971 | Paz | 219/667 |
| 4,272,466 A * | 6/1981 | Harris | 264/40.6 |
| 4,346,433 A | 8/1982 | Rutledge | |
| 4,385,362 A | 5/1983 | Arcara | |
| 4,630,189 A | 12/1986 | Ohmori et al. | |
| 4,639,853 A | 1/1987 | Rake et al. | |
| 5,102,331 A * | 4/1992 | Brekke et al. | 432/152 |
| 5,568,378 A * | 10/1996 | Wojsznis | 700/44 |
| 5,635,409 A | 6/1997 | Moslehi | |
| 5,697,436 A * | 12/1997 | Johnson et al. | 165/254 |
| 5,895,596 A * | 4/1999 | Stoddard et al. | 219/497 |

(Continued)

FOREIGN PATENT DOCUMENTS

EP    1011037 A2  *  6/2000

(Continued)

*Primary Examiner*—Wilbert Starks
*Assistant Examiner*—Crystal J Barnes
(74) *Attorney, Agent, or Firm*—Knobbe, Martens, Olson & Bear, LLP

(57) ABSTRACT

A hybrid cascade Model-Based Predictive control (MBPC) and conventional control system for thermal processing equipment of semiconductor substrates, and more in particular for vertical thermal reactors is described. In one embodiment, the conventional control system is based on a PID controller. In one embodiment, the MBPC algorithm is based on both multiple linear dynamic mathematical models and non-linear static mathematical models, which are derived from the closed-loop modeling control data by using the closed-loop identification method. In order to achieve effective dynamic linear models, the desired temperature control range is divided into several temperature sub-ranges. For each temperature sub-range, and for each heating zone, a corresponding dynamic model is identified. During temperature ramp up/down, the control system is provided with a fuzzy control logic and inference engine that switches the dynamic models automatically according to the actual temperature. When a thermocouple (TC) temperature measurement is in failure, a software soft sensor based on dynamic model computing is used to replace the real TC sampling in its place as a control system input. Consequently, when a TC failure occurs during a process, the process can be completed without the loss of the semiconductor substrate(s) being processed.

44 Claims, 22 Drawing Sheets

U.S. PATENT DOCUMENTS

| | | | |
|---|---|---|---|
| 6,056,781 A * | 5/2000 | Wassick et al. | 703/12 |
| 6,128,586 A | 10/2000 | Pfeiffer | |
| 6,162,488 A * | 12/2000 | Gevelber et al. | 427/8 |
| 6,207,936 B1 | 3/2001 | De Waard et al. | |
| 6,222,164 B1 | 4/2001 | Stoddard et al. | |
| 6,369,716 B1 * | 4/2002 | Abbas et al. | 340/632 |
| 6,373,033 B1 | 4/2002 | De Waard et al. | |
| 6,411,944 B1 | 6/2002 | Ulyanov | |
| 6,424,873 B1 * | 7/2002 | Przybylski | 700/42 |
| 6,496,749 B1 | 12/2002 | Yamaguchi et al. | |
| 6,501,998 B1 | 12/2002 | Pfeiffer | |
| 6,574,972 B1 * | 6/2003 | Giacobbe et al. | 62/96 |
| 6,819,347 B1 * | 11/2004 | Saquib et al. | 347/194 |
| 2003/0202910 A1 * | 10/2003 | Sinha et al. | |

FOREIGN PATENT DOCUMENTS

JP        2004119804 A  *  4/2004

* cited by examiner

HYBRID CASCADE MODEL-BASED PREDICTIVE CONTROL SYSTEM

REFERENCE TO RELATED APPLICATION

The present application claims priority benefit of U.S. Provisional Application No. 60/427,143, filed Nov. 14, 2002, titled "HYBRID CASCADE MODEL-BASE PREDICTIVE AND PROPORTIONAL-INTEGRAL-DERIVATIVE TEMPERATURE CONTROL SYSTEM FOR VERTICAL THERMAL REACTORS," the entire contents of which is hereby incorporated by reference.

FIELD OF THE INVENTION

This invention relates to cascade control systems having nested control loops for controlling a plant, such as, for example, a thermal reactor for processing of semiconductor substrates.

BACKGROUND OF THE INVENTION

In semiconductor processing, the wafer size continues to increase and the integrated circuit feature size continues to decrease. Further increases wafer size and further decreases in feature size require improvements in thermal process control. The temperature at which wafers are processed has a first-order influence on the diffusion, deposition, and other thermal processes. Batch furnaces continue to play a significant role for thermal processing because of their large batch size and correspondingly low cost per processed wafer. A target in batch thermal processing is to achieve improved temperature control while maintaining high equipment utilization and large wafer batch sizes. The requirements of high-quality temperature control include a high ramp rate with good temperature uniformity during the ramp, fast temperature stabilization with little or no temperature overshoot, smaller steady-state temperature error band, shorter downtime for controller parameter tuning, etc. The traditional single-loop Proportional-Integral-Derivative (PID) controllers cannot achieve the required temperature control performance. PID controllers with cascade or nested control loops have been used in attempts to provide improved temperature control. However, these and other previous approaches have practical drawbacks related to complexity and computational requirements.

SUMMARY OF THE INVENTION

The present invention solves these and other problems by providing a computationally-efficient hybrid cascade MBPC control system that can be implemented on a typical control microprocessor. In one embodiment, the hybrid cascade MBPC control system is a cascade-type system with nested control loops having an MBPC controller in an outer control loop and a conventional controller in an inner control loop. In one embodiment, the conventional controller is a PID controller. In one embodiment, the conventional controller is an H∞ controller. In one embodiment, the hybrid control system uses a simplified MBPC control loop and a modified PID loop with a robust auto-tuner. The MBPC controller acts as a main or outer control loop, and the PID loop is used as a slave or inner control loop.

In one embodiment, the hybrid cascade MBPC can be used to control a thermal process reactor where the MBPC controller generates the desired spike TC control setpoint according to both planned paddle control setpoint trajectory and the dynamic model related to paddle and spike TC. In the thermal process reactor, the PID loop is used to control the power actuator of the heater to reach the required spike control setpoint by acting as a local system to quickly follow changes in the spike control setpoints.

The PID tuning parameters are relatively weakly coupled with the MBPC loop. The sampling time ts1 in the PID control loop is preferably shorter than the sampling time ts2 in the MBPC control loop. In one embodiment, ts1 is on the order of approximately 1 second and ts2 is on the order of approximately 4 seconds. In one embodiment, based on both dynamic and static models, tuning of the PID parameters is realized automatically. Compared with a single loop MBPC, the model order and the predictive time horizon in this control scheme can dramatically be reduced while the model still adequately describes and predicts the behavior of the actual system. In one embodiment, model derivations are done prior to wafer processing.

In one embodiment, the expected temperature control range $[T_{min}, T_{max}]$ is divided into R temperature sub-ranges $([T_{min1}, T_{max1}], [T_{min2}, T_{max2}] \cdots [T_{min\ R}, T_{max\ R}]$, where $T_{min}=T_{min1}$, $T_{max}=T_{max\ R}$ and $T_{max\ r-1}=T_{min\ r}$). This allows the use of linear dynamic models for an adequate description of the dynamic behavior within each temperature zone. Corresponding to each sub-temperature range and heating zone, two kinds of dynamic linear models are built as:

$$Pd_{nr}(t)=f_{nr}(Sp_{nr}(t)) \quad (1)$$

$$Sp_{nr}(t)=g_{nr}(Pw_{nr}(t),Pd_{nr}(t)) \quad (2)$$

where n is the heating zone number, r is the temperature sub-range, Pd is the temperature measured by the paddle TC, Sp is the temperature measured by the spike TC, Pw is the system power output, and $f_{n,r}$ and $g_{n,r}$ are linear functions.

In one embodiment, the dynamic model of Equation (1) is used for both MBPC control and soft-sensor computing, and the dynamic model of Equation (2) is used for soft-sensor computing and PID parameter auto-tuning of the inner control loop.

Corresponding to the expected temperature control range, the static polynomial models are built as:

$$Sp_n=h_n(Pd_n) \quad (3)$$

where, $h_n$ are the static polynomial models. In one embodiment, the static models are used in limiters of the MBPC controller and for inner PID parameter auto-tuning.

In one embodiment, the MBPC control algorithm embeds intuitive tuning parameters (e.g., $k_u$, $k_s$) into the control law, the trajectory planner and the limiters. The intuitive tuning parameters can be used to improve both the dynamic control performance and the static control performances. The simplified MBPC control structure and fixed-time predictive horizon avoids the need of online matrix inversion during wafer processing. As a consequence, the online computing overhead is greatly reduced. In this way, the hybrid cascade MBPC control system algorithm can be implemented on microprocessors typically used in practice in the semiconductor processing industry.

In one embodiment, a generic trajectory planer is added to the MBPC control loop to generate the temperature control setpoint reference trajectory. Based on the desired ramp rate and temperature range, the trajectory planner divides the temperature range into two sub-ranges: fast ramp; and reduced ramp. In the fast ramp sub-range, the planner generates the temperature control setpoints reference trajectories to enable the MBPC to achieve the desired ramp rate.

In the reduced ramp sub-range, the planner provides at least one intuitive tuning parameter to control the temperature ramp speed to reach the desired control setpoint. Temperature stabilization time and overshoot are also controlled. This provides a flexible way to meet the varying temperature control requirements from the different processes.

When a temperature ramp range covers more than one temperature sub-range, the MBPC switches its internal dynamic models so that the dynamic model, operative at a certain moment, corresponds with the actual temperature sub-range at that moment. In one embodiment, fuzzy logic switches and inference are added to the MBPC control loop to realize a smooth transition of the dynamic models when going from one temperature sub-range to an adjacent temperature range. In this case, fuzzy inference is effective to bring about a gradual change of one dynamic model to the other without inducing extra disturbance into the control system.

In one embodiment, static limiters based on static models are embedded in the MBPC loop. The limiters help the MBPC to generate the correct control setpoint for the inner-control loop under various control cases (normal, faster/slower ramp, boat in/out, different load or gas flow and so on).

In one embodiment, the PID controller in the inner control loop is provided with a parameter auto-tuner and/or anti-wind-up capability to enhance the robustness of the PID controller, and simplifies its usage. The inner PID follows the spike control setpoint changes that are generated by the MBPC control loop.

In one embodiment, a software detector and control logic are included to detect TC measurement hardware failure. When a TC sampling failure appears, the detector and control logic switch on a related soft temperature sensor that is based on dynamic model computing. Then the soft-sensor is used to replace the real TC in its place as a control system input. This prevents the reactor operation from shutting down, and reduces the loss of the whole batch process due to the detection of one or more temperature measurement hardware failures.

DETAILED DESCRIPTION

Figure 1:
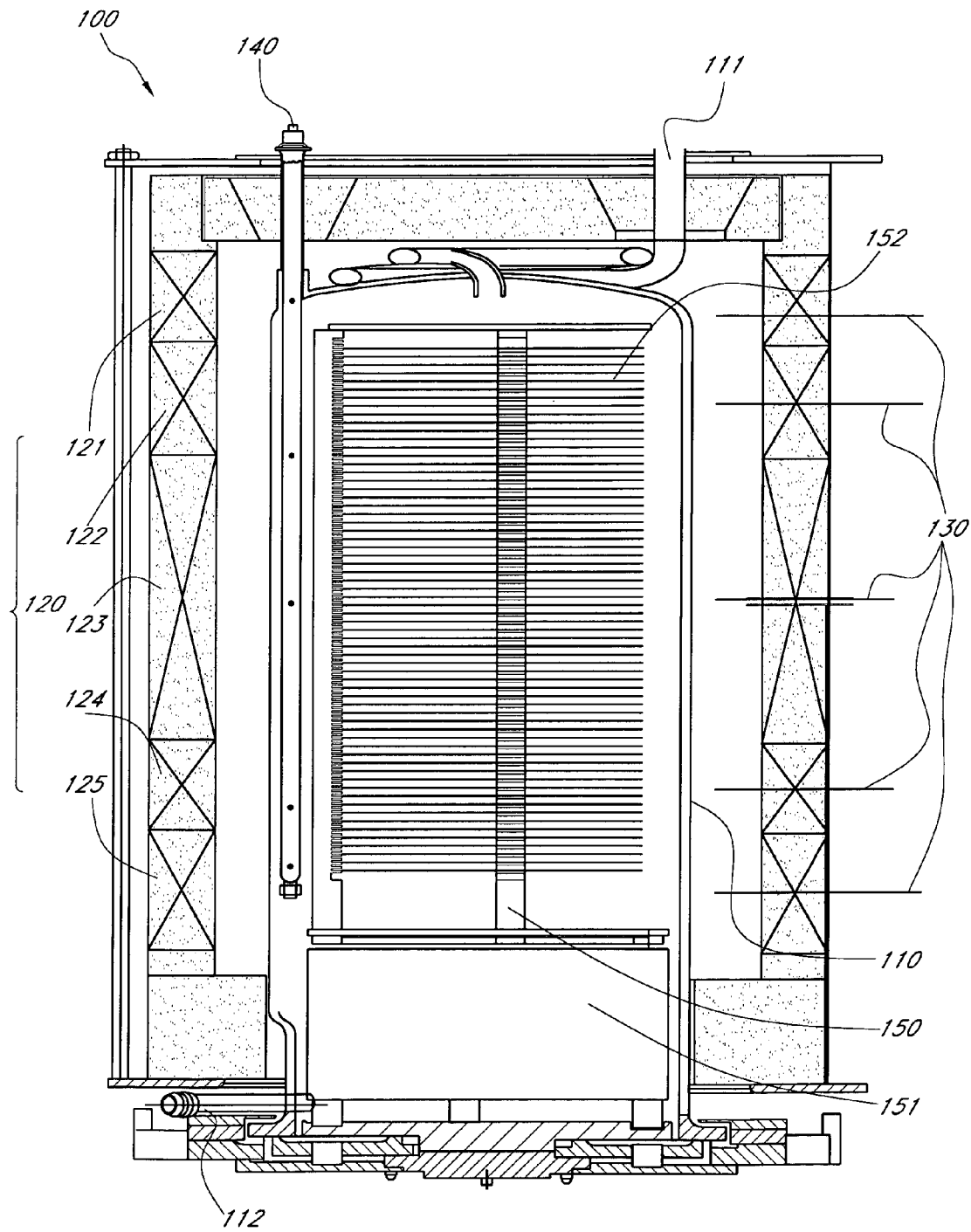
FIG. 1 shows a vertical thermal reactor with spike Thermocouples and paddle Thermocouples.

A typical vertical thermal reactor 100 is shown in FIG. 1. The vertical thermal reactor 100 includes a long quartz or silicon carbide process tube 110 delimiting a process region. A batch of wafers 152, accommodated in a wafer boat 150, placed on a pedestal 151 for support and thermal isolation, are inserted into the process tube 110. The process tube 110 includes an inlet 111 and an outlet 112 for process gas. The process tube is surrounded by a heating element 120 having multiple zone electric heating coils 121 to 125. Each zone has one or more temperature sensors. In FIG. 1, each zone has a spike ThermoCouple (TC) 130 and a "profile" or paddle ThermoCouple (TC) 140. The spike TC produces a spike TC signal corresponding to a spike temperature. The paddle TC produces a paddle TC signal corresponding to a paddle temperature. The spike TCs 130 are located outside the process tube 110 relatively near the heating element and the paddle TCs are located inside the tube 110 relatively near the wafers. The vertical reactor system 100, using the resistive heating element 120 to control temperature, is an inherently non-linear system because an electric heating element can only generate, not absorb, heat. Further, due to the large physical mass of the heating element 120, process tube 110, and wafer batch 152, and a correspondingly high thermal mass or heat capacity, the vertical thermal reactor 100 exhibits long time constants or delay times. This means that after increasing the power input of one or more of the heating coils 121–125, it takes a relatively long time before a new steady-state at a higher temperature is achieved. When the reactor temperature is higher than the control setpoint, cooling occurs at a rate that depends on the reactor design and its temperature, not on the controller. In the case of overshoot, it takes a relatively long time before the system is cooled down to the control setpoint again, especially at lower temperatures where the natural cooling rate is lower.

Figure 2:
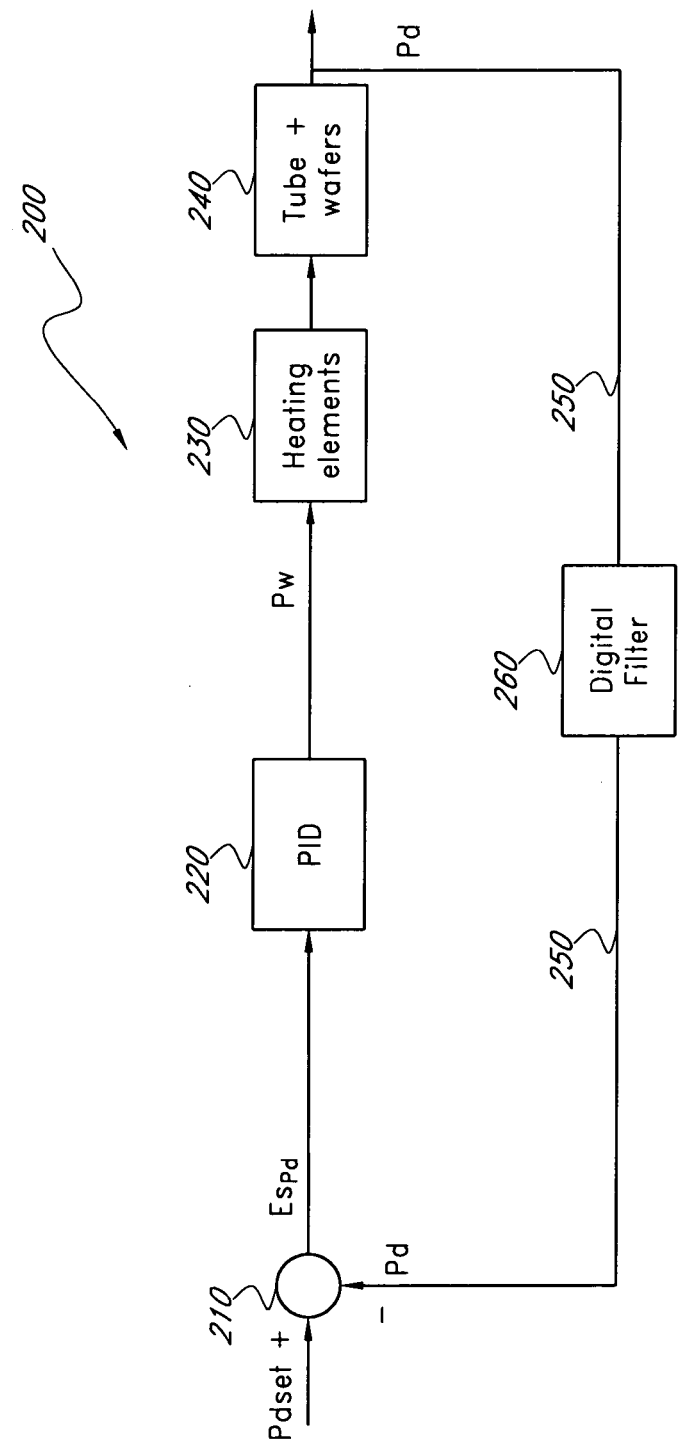
FIG. 2 shows a prior art single loop paddle PID control configuration.

Historically, the temperature in thermal reactors was controlled by a spike TC control loop, using a PID control algorithm. By profiling the furnace in a static mode, using a paddle TC, the relation between paddle TC and spike TC under static conditions was established and stored in a profile table. Such a profiling procedure was performed at regular intervals or after maintenance. Because the paddle TC gives a more relevant reading for the actual wafer temperature, there has been a desire to use a paddle TC control loop that would make the time-consuming profiling procedure unnecessary. A control configuration 200 employing such a paddle TC control loop is shown in FIG. 2. In the configuration 200, an adder 210 computes an error signal $Es_{Pd}$ from the paddle control setpoint Pdsei and the actual paddle temperature Pd. Based on the error signal $Es_{Pd}$, the PID controller 220 generates a power output signal Pw that is provided, via a thyristor unit, not shown, to the heating elements 230. The tube and wafers are indicated by 240. A feedback loop 250 that includes a digital filter 260, provides the actual paddle TC signal to the adder 210. However, such a paddle TC control loop, as shown in FIG. 2, has such a strong non-linear behavior and long time constants that it is difficult or impossible to achieve a stable control loop with acceptable performance under dynamic conditions.

Figure 3:
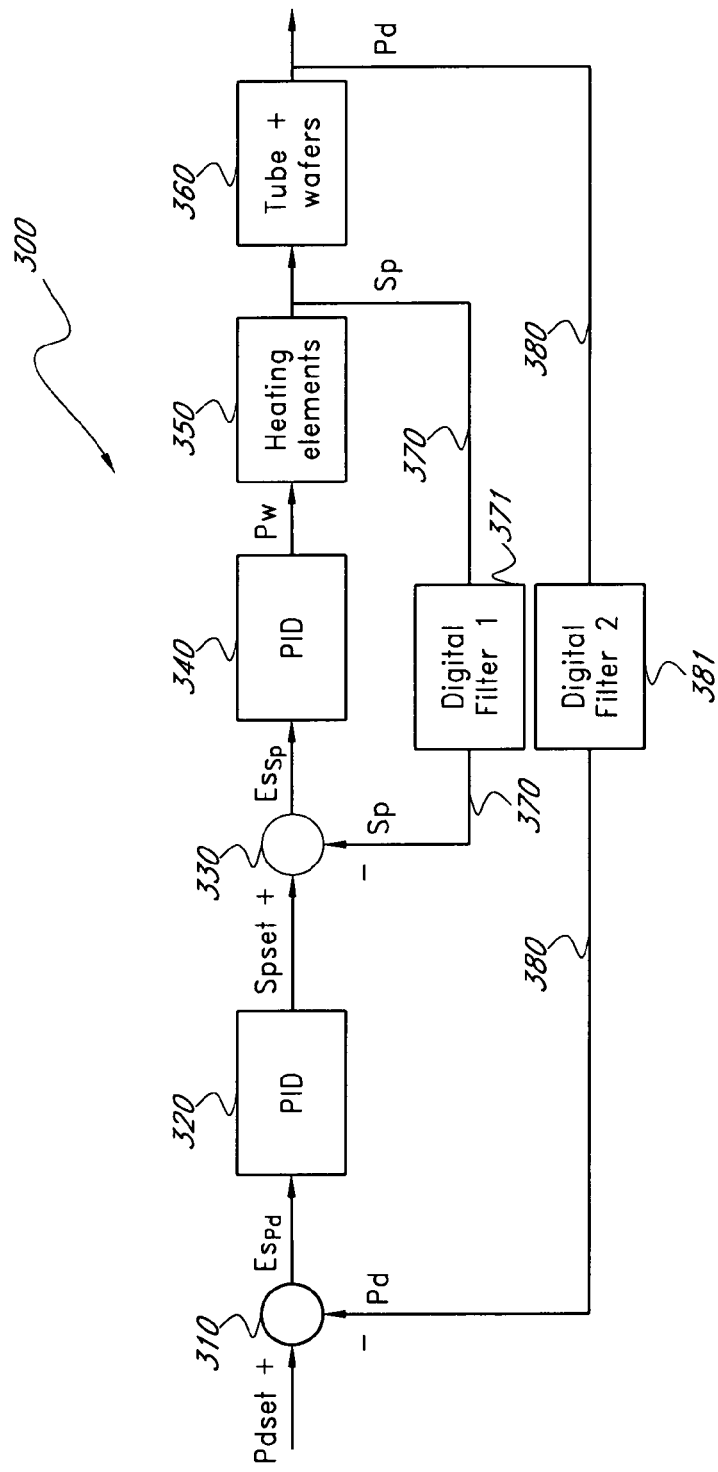
FIG. 3 shows a prior art cascade PID control configuration using nested PID control loops.

A so-called cascade controller 300, as shown in FIG. 3, uses an inner spike temperature control loop PID controller, with the spike temperatures as inputs, to control the heating elements. An additional outer loop, with the paddle TC temperatures as inputs, is used to generate time-dependent setpoints given to the spike temperature control loop. In the cascade controller 300, the spike TC temperatures are controlled by a PID controller 340 in an inner loop 370. An adder 330 provides an error signal $Es_{Sp}$ to the PID controller 340. The error signal $Es_{Sp}$ is based on a spike TC control setpoint $Sp_{set}$ and the actual spike temperature Sp. The PID controller 340 provides a power output signal Pw that is provided via a thyristor unit, not shown, to the heating elements 350 to heat a tube and wafers 360. A second PID controller 320 in an additional, outer, control loop 380 generates a spike control setpoint $Sp_{set}$. The second controller 320 receives a paddle error signal $Es_{Pd}$ from the adder 310, calculated from the paddle control setpoint Pdset and the actual paddle temperature Pd. Feedback loops 370 and 380 include digital filters 371 and 381 respectively to remove spurious data.

A typical thermal process starts at a standby temperature at which the wafers are loaded into the thermal reactor. After loading, the thermal reactor heats up to the desired process temperature for oxidation, annealing, drive, or CVD. After performing the process, the thermal reactor cools to the stand-by temperature again and unloads the wafers. If the standby temperature, ramp up/down rate, and process temperatures are set in reasonable ranges, acceptable temperature control performance can be achieved during the process by using the cascade PID controller 300. However, optimizing the performance of the cascade PID controller 300 often requires significant off-line time for tuning of the controller parameters such as the PID parameters. Tuning of a cascade controller is often more of an art than a science and usually very time consuming. The best choice of tuning parameters depends on a variety of factors including the dynamic behavior of the controlled process, the controller's objectives, and the operator's understanding of the tuning procedures. For a cascade PID controller, the inner and outer loop tuning is strongly coupled, which adds to the tuning complexity. Besides the tuning of PID parameters, for dealing with long time delay, the outer or "profile" PID control loop of a cascade PID controller still needs a "profiling table" to provide constraints. Generating the profiling table involves a procedure that requires many hours of off-line equipment time. Off-line time cannot be used for useful wafer processing and is thus very expensive.

Figure 4:
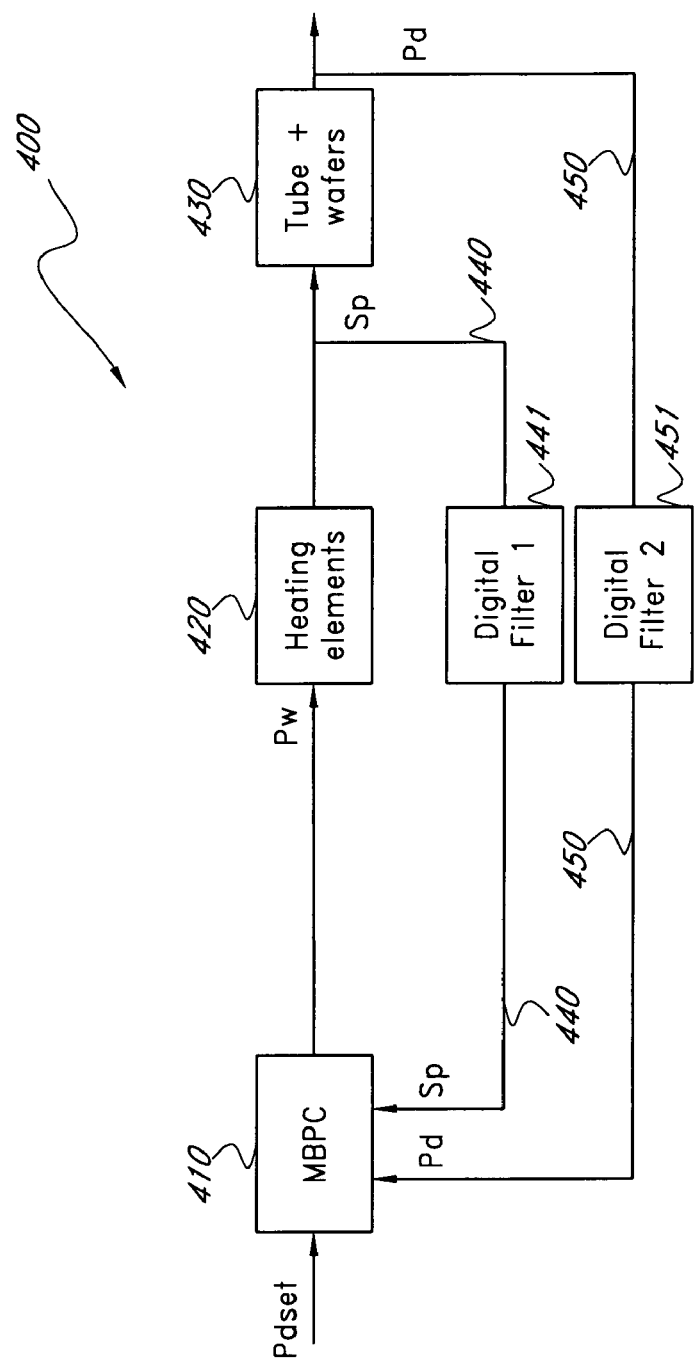
FIG. 4 shows a prior art single loop MBPC control configuration.

With the advances in modern control technology and system identification, more advanced control systems, such as, for example Model-Based Predictive Controllers (MBPC), have been developed, but these more advanced control methods are often computationally complex, typically requiring matrix inversion during online processing. FIG. 4 shows a single loop control system 400 that includes a MBPC 410. The MBPC 410 receives as input a paddle control setpoint Pdset. The controller 410 also receives as input the actual spike temperatures Sp and actual paddle temperatures Pd via feedback loops 440 and 450, respectively. The controller 410 generates a power output signal Pw that is provided via a thyristor unit, not shown, to heating elements 420 that heat a tube and wafers 430. Feedback loops 440 and 450 include digital filters 441 and 451, respectively. The use of spike temperatures is optional. The MBPC 410 uses a complex dynamic model of the controlled process to compute the predictive control signals by minimizing an objective function to provide on-line optimization control. In the MBPC controller 410, tuning is relatively easy as compared to a cascade PID controller, and the MBPC 410 can compensate for delay times. In the MBPC 410, treatment of constraints in the system to be controlled is conceptually simple and multivariable control is conceptually straightforward, though computationally complex. The MBPC 410 typically relies on dynamic models, which are not required for the traditional PID controllers. The MBPC 410 typically requires a relatively large amount of computational resources, particularly when constraints are considered. This can cause problems in practice when the control processor cannot provide the necessary computational resources.

Figure 5A:
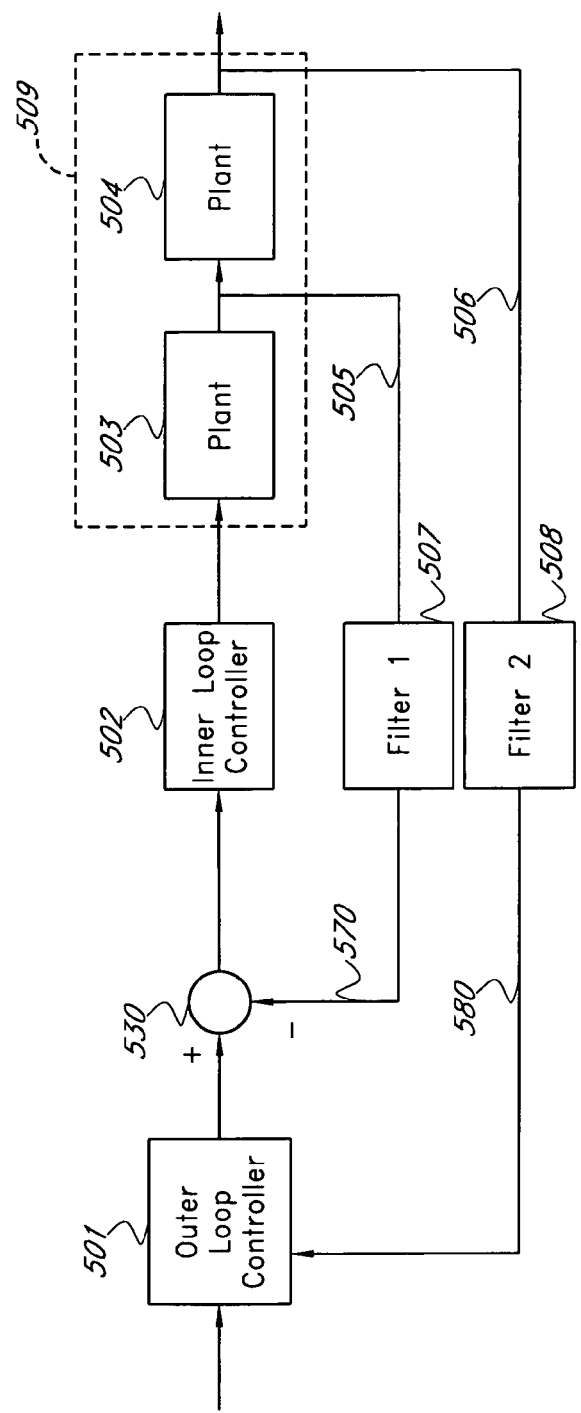
FIG. 5A shows a hybrid cascade control system having nested control loops with an outer loop and an inner loop.

FIG. 5A shows a hybrid cascade controller having an outer loop controller 501 in an outer control loop and an inner loop controller 502 in an inner control loop. The outer loop controller 501 provides, to a non-inverting input of an adder 530, a control setpoint for the inner loop controller 502. An output of the adder 530 is an error signal that is provided to a control input of the inner loop controller 502. A control output of the inner loop controller 502 is provided to a plant 509. A sensor output 505 from one or more inner loop sensors of the plant 509 is provided to an input of a filter 507. An output from the filter 507 is provided to an inverting input of the adder 530. A sensor output 506 from one or more outer loop sensors of the plant 509 is provided to an input of a second filter 508. An output of the second filter 508 is provided to an input of the outer loop controller 501. The filters 507 and 508 can be omitted. In one embodiment, the inner loop sensors (corresponding to the sensor output 505) tend to measure one or more operating parameters of a first portion 503 of the plant 509. In one embodiment, outer loop sensors (corresponding to the sensor output 506) tend to measure one or more operating parameters of a second portion 504 of the plant 509. In one embodiment, the first portion 503 responds to changes in the control output of the inner loop controller relatively more rapidly than the second portion 504.

In one embodiment, the sensor output 505 corresponds to sensors that tend to respond relatively more quickly but relatively less accurately to certain desired parameters than the sensors corresponding to the sensor output 506. In one embodiment, the sensor output 506 corresponds to sensors that tend to respond relatively less quickly but relatively more accurately to certain desired parameters than the sensors corresponding to the sensor output 505. Thus, in one embodiment, the inner loop controller 502, using the sensor output 505 is able to respond relatively quickly to certain changes in the plant 509 but relatively less accurately. The outer loop controller 501, using the sensor output 506 is able to respond relatively less quickly to certain changes in the plant 509 but relatively more accurately to certain desired parameters. In one embodiment, the outer loop controller 501 is configured to produce a setpoint for the inner loop controller 502 to improve the controlled properties of the plant. In one embodiment the inner loop controller 502 includes a conventional controller, such as a PID controller. In one embodiment, the outer loop controller includes a predictive-type controller. In one embodiment, the outer loop controller includes a MBPC controller.

Figure 5B:
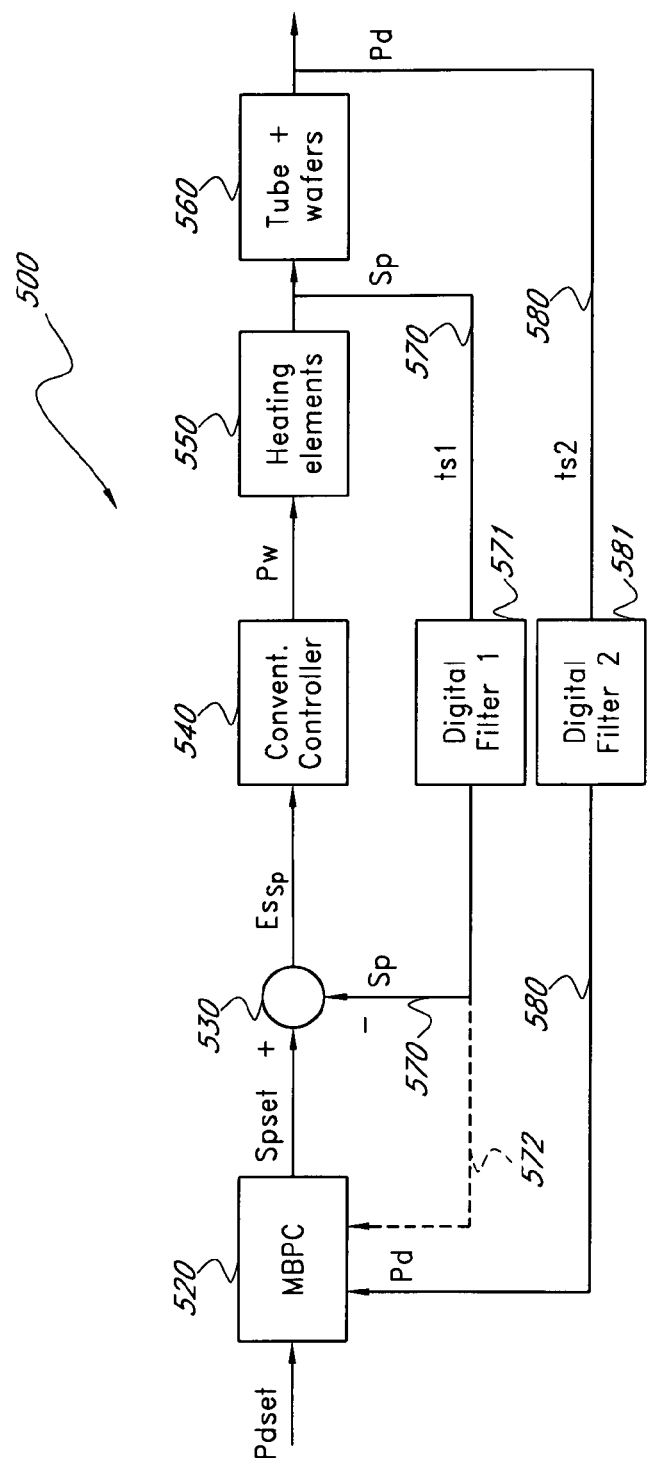
FIG. 5B shows a hybrid cascade MBPC control system having nested control loops with a MBPC outer loop and a conventional controller inner loop for controlling a thermal process plant.

FIG. 5B shows a hybrid cascade thermal process plant controller 500 that uses a MBPC 520 in an outer control loop and a conventional controller 540 in an inner control loop. The cascade controller 500 is one embodiment of the hybrid cascade control system shown in FIG. 5A. The MBPC 520 receives as input a paddle control setpoint temperature Pdset and the actual paddle temperature Pd received via feedback loop 580. In one embodiment, the feedback loop 580 includes a digital filter 581. The MBPC 520 receives as input for the model calculations the actual spike temperatures via an input 572. The MBPC 520 calculates as output a spike TC control setpoint Spset. An adder 530 calculates a spike error signal $Es_{Sp}$ by subtracting the actual spike TC temperature Sp, received via feed-back loop 570, provided by a digital filter 571, from the spike TC control setpoint. The spike error signal $Es_{Sp}$ is provided to the conventional controller 540 which generates a power output signal Pw that is provided via a thyristor unit, not shown, to heating elements 550 to heat a tube and wafers 560. The sampling time ts1 in the inner control loop is preferably shorter than the sampling time ts2 in the outer MBPC control loop. In one embodiment, ts1 is in the range of 1 second and ts2 is in the range of 4 seconds. The conventional controller 540 can be implemented using a PID controller, an H controller, etc.

As the name implies, the MBPC 520 is based on a model of the controlled plant. In a thermal process reactor, the MBPC 520 typically relies on several models corresponding to the different thermal zones of the vertical thermal reactor. The simplest model is a static model, describing the relation between spike TC temperature and paddle TC temperatures under steady-state conditions according to Equation (3). In one embodiment, the static model is based on $4^{th}$ order polynomial models representing the relation between spike TC and paddle TC temperatures over a specified temperature range. Dynamic models describe the dynamic response of the system. A dynamic paddle model gives the paddle TC temperature as a function of spike TC temperature according to Equation (1) and a dynamic spike model gives the spike TC temperature as a function of power output and paddle TC temperature, according to Equation (2). By dividing the temperature range in a plurality of temperature sub-ranges, a set of linear dynamic models can be obtained. This simplifies the required calculations. The various models are acquired experimentally from a measurement procedure as described below.

Figure 6:
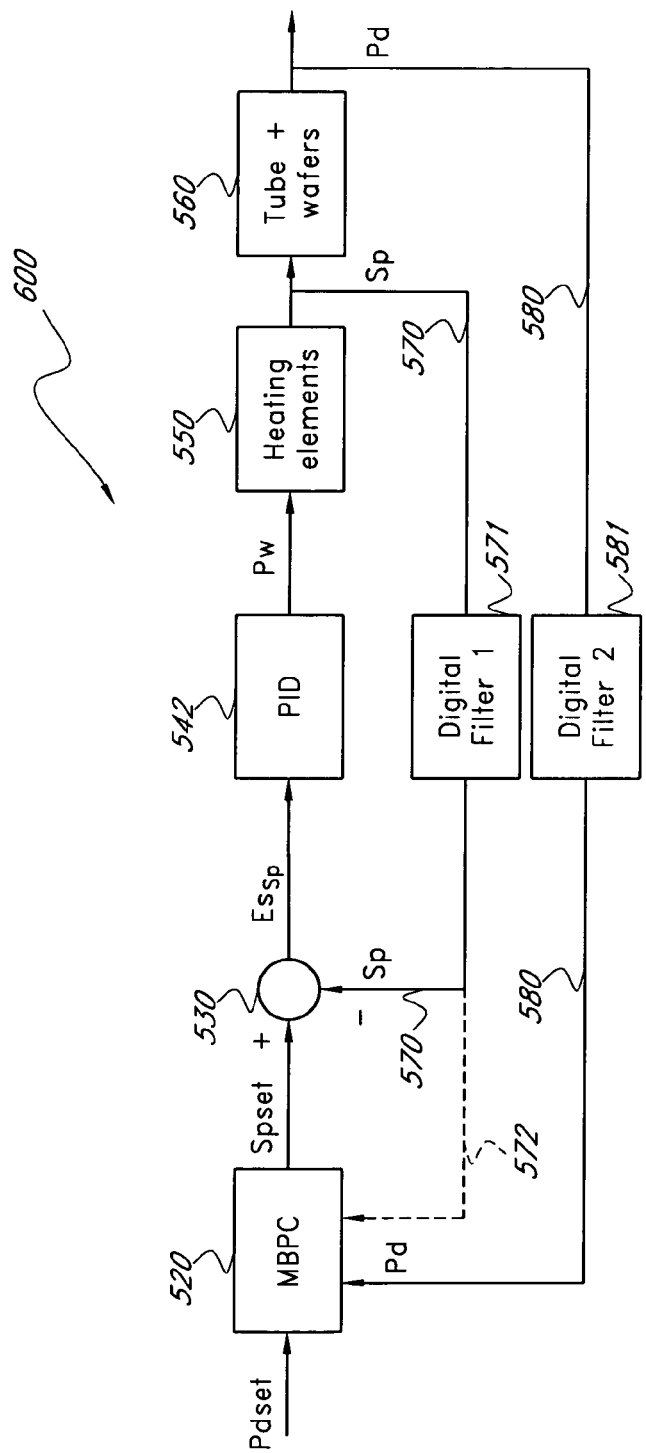
FIG. 6 shows a Hybrid MBPC control system based on a MBPC and a PID controller.

FIG. 6 shows a hybrid control system 600. The control system 600 is an embodiment of the control system 500. In the control system 600, the conventional controller 540 is based on a PID controller 542.

Figure 7:
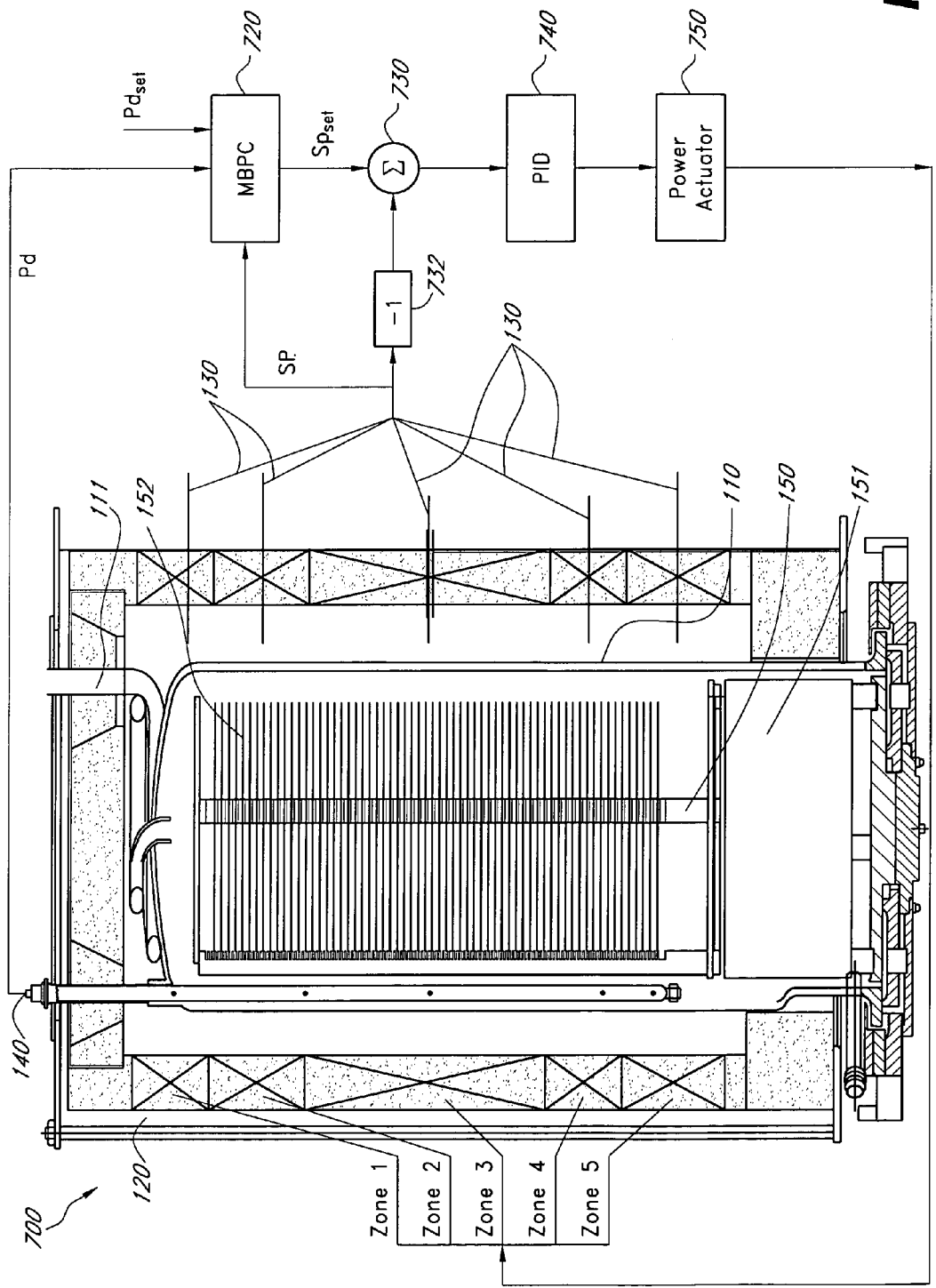
FIG. 7 shows a vertical thermal reactor with the hybrid cascade MBPC/PID control configuration.

FIG. 7 shows a vertical thermal reactor system 700 where the vertical thermal reactor 100 is controlled by the hybrid cascade control system 600. In the system 700, the process tube 110 is surrounded by the heating element 120, comprising multiple zone electric heating coils. Each zone has the spike TC 130 and the "profile" or paddle TC 140. The spike TC is located outside the process tube relatively near the heating element and the paddle TC is located inside the tube relatively near the wafers. A paddle control setpoint $Pd_{set}$ and the actual paddle temperatures Pd are provided to an MBPC controller 720 (corresponding to an embodiment of the MBPC controller 520), which generates a spike control setpoint $Sp_{set}$. An adder 730 computes a spike TC error signal using the spike control setpoint $Sp_{set}$ and the actual spike temperatures, provided to the adder 730 via an inverter 732. A PID controller 740 uses the spike error signal to generate a power output signal that is provided to a power actuator 750 to provide power to control the heating element 120.

The identification test design plays an important role in a successful model identification and MBPC design. Current practices of identification methods are to use single variable step or finite impulse tests for MBPC model identification. The tests are carried out manually. The advantages of these methods are that the system dynamic responses are described in an intuitive manner. One drawback with the step or finite impulse tests is that the data from these tests may not contain enough information about the multivariable characteristics of the process because the step or pulse signals may not induce enough dynamic behavior of the process. A second drawback of these step or impulse tests is that they can be very time consuming. To avoid the above-mentioned drawbacks of common identification methods, during the identification procedure for the MBPC 720, the inner-loop PID control loop 740 is actively used. The PID constants used during the model identification are based on previous control experiences of the vertical thermal reactor. Then, using this inner-loop PID controller 740, the system identification can be carried out automatically by using a model identification and data acquisition recipe. The signals inducing dynamic behavior of the system are real control signals, and the conditions are similar to real process conditions. In this case, the PID controller 740 helps to keep the spike TC temperatures within their limits. The models based on these inner closed-loop data enhance the performance and stability margins of the system 700.

Figure 8:
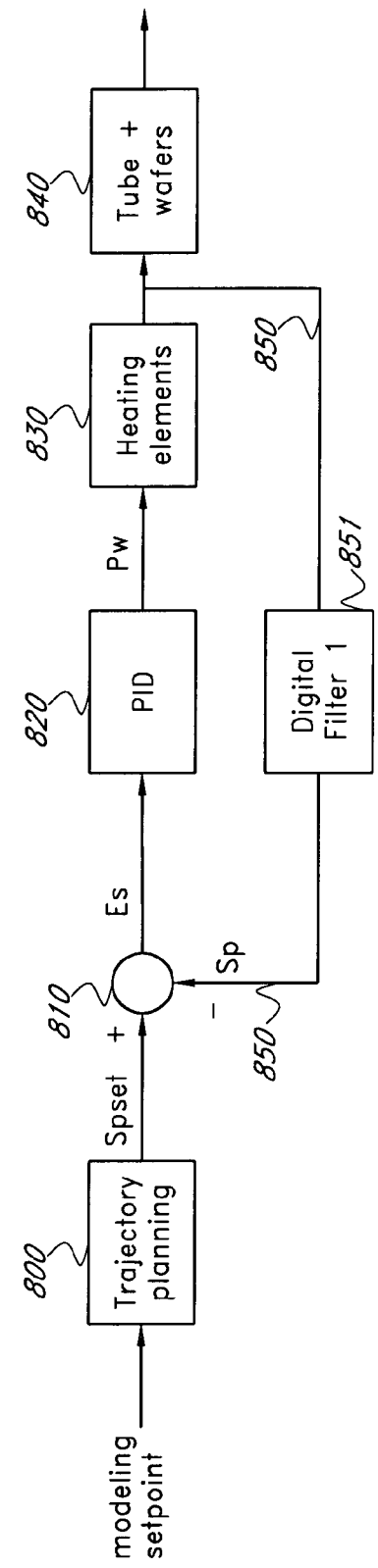
FIG. 8 shows a MBPC configuration used for model identification.

In one embodiment, the modeling data acquisition is achieved by using the control scheme shown in FIG. 8. In FIG. 8, a temperature control setpoint for model identification is provided to a trajectory planning unit 800, which creates a time-dependent spike TC control setpoint temperature $Sp_{set}$ such as, for example, a controlled ramp-up rate. An adder 810 calculates a spike error signal Es, using the spike control setpoint $Sp_{set}$ and the actual spike temperatures, received via a feedback loop 850, provided with a digital filter 851. A PID controller 820 uses the spike error signal Es to calculate a power output Pw signal that is provided via a thyristor unit, not shown, into the heating elements 830 to heat a tube and wafers 840.

An example identification control process sequence (i.e., a "recipe") for a vertical thermal reactor starts at room temperature and ramps up at a ramp rate (that is, a time rate of change) of 10° C./min, stabilizing the spike temperature for approximately 45 minutes at 200, 400, 600, 800 and finally 1000° C., using a PID controller in the configuration of FIG. 8. In order to prevent slip, the ramp rate during the last step is 5° C./min. During execution of the model identification and data acquisition recipe, the resulting actual spike and paddle temperature signals (shown in FIGS. 9–11, respectively) and the power output signals are recorded and stored for modeling.

The data collected from the recipe is divided into five data subsets, corresponding to the five stabilization temperatures of the model identification and data acquisition recipe. Each subset starts at the beginning of a ramp up period and ends just before the beginning of the next ramp up period.

In contrast to prior art model identification methods where data is acquired in open loop control, in the present invention the data is acquired in closed loop control as shown in FIGS. 7 and 8. Therefore, the collected data is typically free of spurious data, so little or no data pre-processing is required to remove spurious data points.

2. Model Structure 2.1 Static Models

Figure 9:
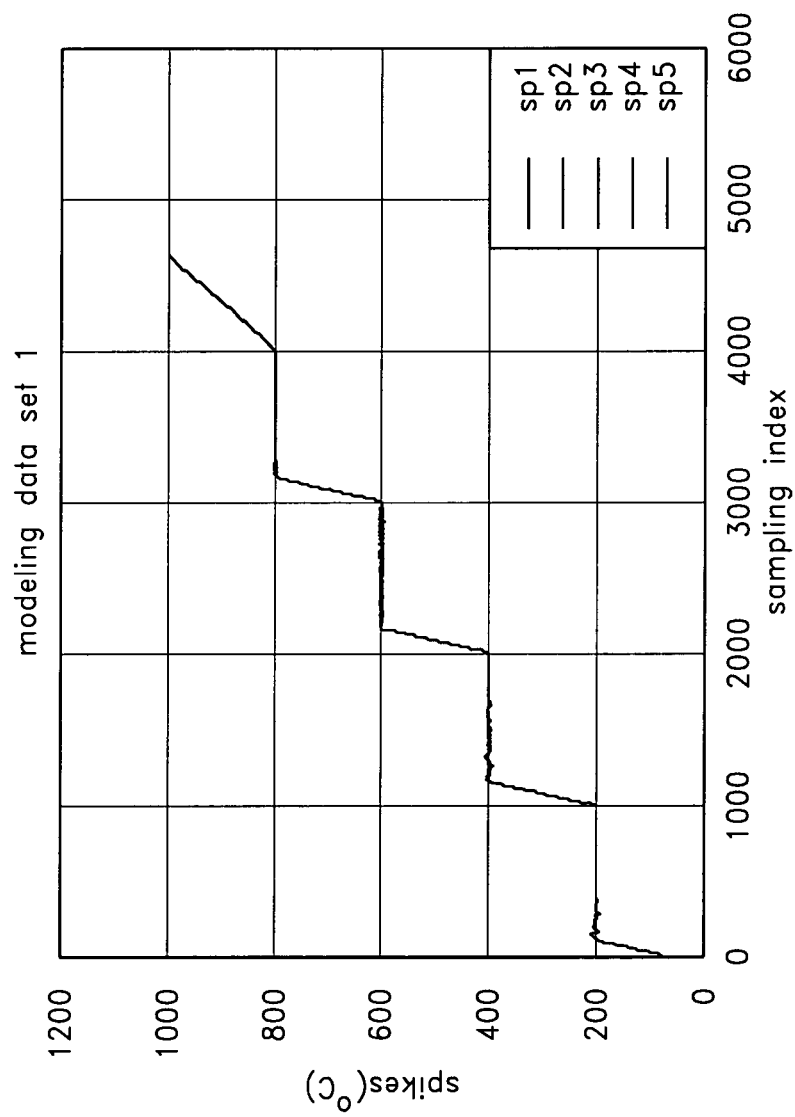
FIG. 9 shows a modeling sample data set 1 in which the spike TC temperatures are controlled in steps at 5 different temperature levels according to the MBPC configuration for model identification of FIG. 8.
Figure 10:
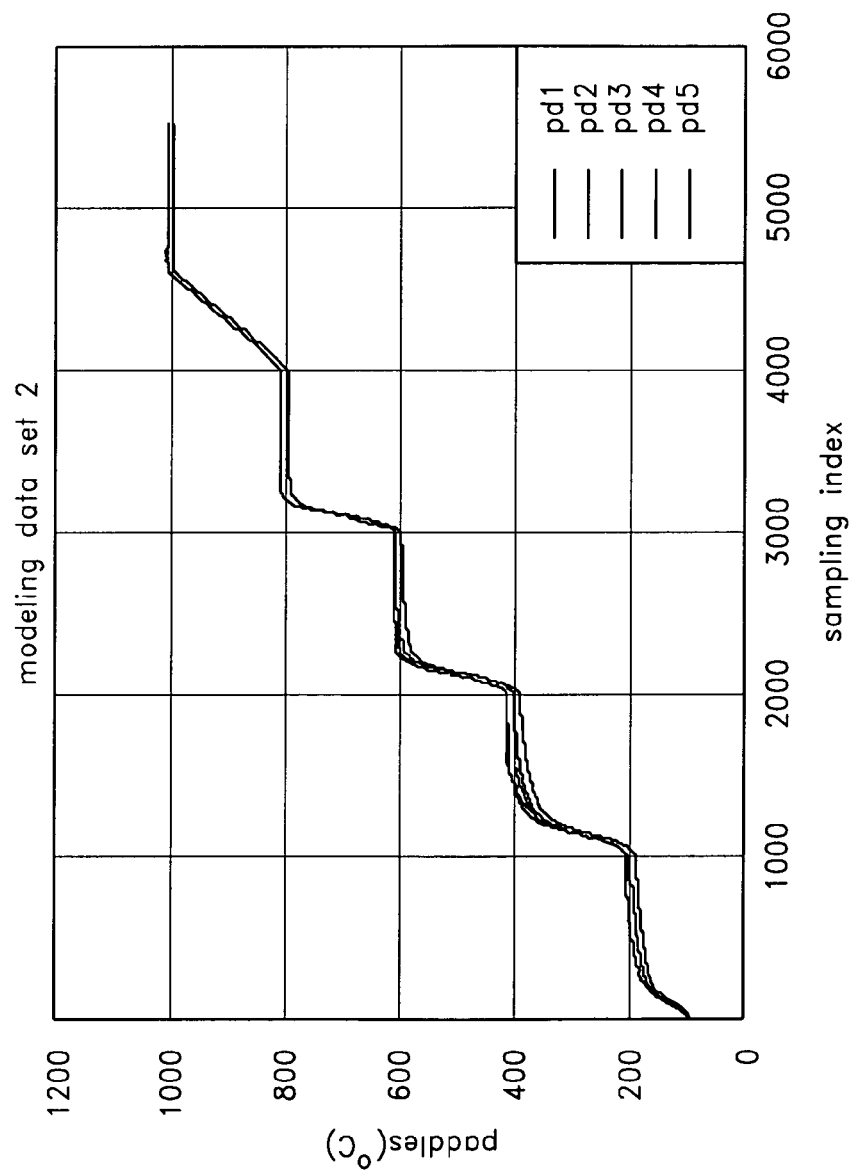
FIG. 10 shows a modeling sample data set 2, corresponding to sample data set 1 of FIG. 9, showing the free response results of paddle TC temperatures.
Figure 11:
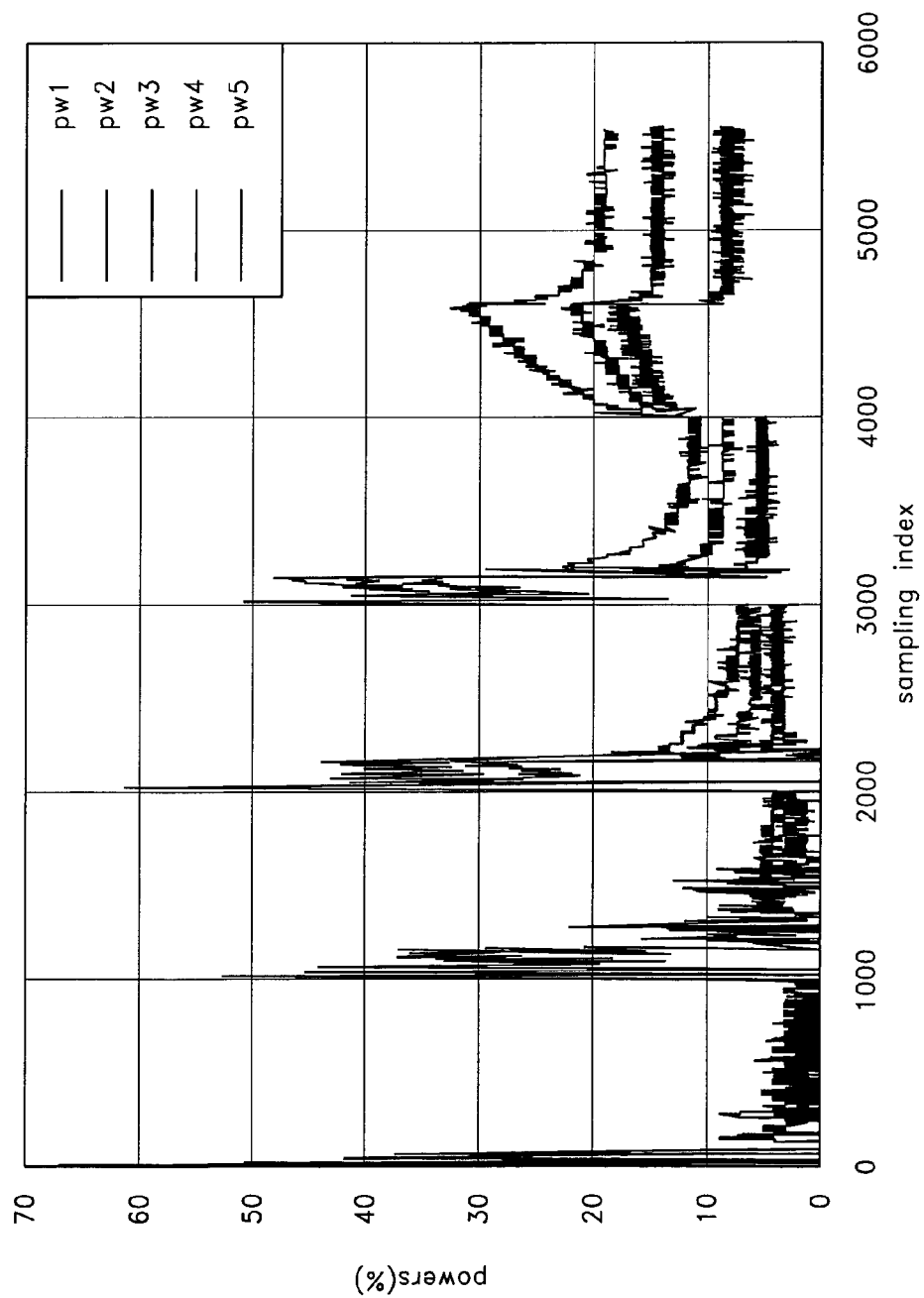
FIG. 11 shows a modeling sample data set 3, corresponding to sample data set 1 of FIG. 9, showing the recorded power outputs.

For each zone, a static model is derived. For each stabilization temperature in the identification recipe, at least one value is extracted both for the spike TC temperature and the paddle TC temperature. These pairs of values, 5 in the example shown in FIGS. 9–11, are used to estimate the parameters for the static model using a parameter estimation technique, such as, for example, a polynomial fit, least-squares fit, etc. In one embodiment, the model equation for the static model is:

$$Sp_n = h_n(Pd_n) \quad (4)$$
$$= s_{n0} + s_{n1}Pd_n + s_{n2}Pd_n^2 + \ldots + s_{n(q-1)}Pd_n^{q-1} + s_{nq}Pd_n^q$$

where n is the zone number, $s_{nq}$ are the static models parameters to be determined, and q is the order of the static model. The model according to equation (4) gives an adequate description of the relationship between the spike temperature Sp and the paddle temperature Pd over the desired temperature range.

2.2 Dynamic Models

For each zone, a dynamic model is derived from each data subset for the spike TC and the paddle TC. This means that in the case of five zones and five temperature sub-ranges, according to the present example, 25 dynamic paddle linear models and 25 dynamic spike linear models are used. It will be clear to one of ordinary skill in the art that any number of thermal zones and temperature sub-ranges can be selected, depending on the circumstances. In one embodiment, a linear least-squares algorithm is used. The model equations for the dynamic linear models are:

where n is the zone number, r is the temperature range number, t is the discrete time index, $a_{nrl}$ and $b_{nrm}$ are paddle model parameters, l and m are model orders of the paddle models, and $c_{nrx}$, $d_{nry}$ and $p_{nrz}$ are spike model parameters, Further, x, y, and z are model orders of the spike models, and $e_{nrp}$ and $e_{nrs}$ are model errors or disturbances. Typically, a first or second order approximation (m=1 or 2) is adequate for the model of equation (5) whereas the order for the model of equation (6) is typically 20 or more (e.g., l=28) for an adequate description.

Model validation can be provided by visual comparison of the measured and calculated model output, simulation, residual analysis, cross-correlation analysis, etc.

3. Mathematics of Model Extraction

The methods used for parameter estimation for both the static models and the dynamic models involve solving a linear least-squares problem (LLS). This can be done via the so-called normal equations, or via a QR-decomposition. The method via QR-decomposition typically requires more calculations, but tend to be numerically more stable. For most cases, solving the normal equations gives good results, but for higher orders it is safer to use the QR-decomposition.

The method of solving the LLS problem is described below. Given a system of equations defined as A·x=b, where A is a matrix and x and b are vectors, the linear least-squares problem is to find a vector x that minimizes $$\phi(x)=\|A \cdot x - b\| \quad (7)$$

If the matrix A is non-singular (i.e., if the inverse of A exists), this problem has a unique solution.

3.1 Solving LLS via the Normal Equations

The direct method of solving a LLS problem is via the normal equations. If a function has a minimum, its derivative at that minimum is zero. Thus $\phi(x)$ has a minimum where d $\phi(x)/dx=0$ or:

$$A^T A \cdot x - A^T \cdot b = 0 \quad (8)$$

where $A^T$ is the inverse matrix of A. This results in the so-called Gaussian normal equations:

$$A^T A \cdot x = A^T \cdot b \quad (9)$$

From these equations, x can be calculated as $$x = (A^T A)^{-1} A^T b \quad (10)$$

3.2 Solving LLS via OR-decomposition

Another method of solving a LLS problem is via QR-decomposition. With this algorithm the matrix A is expressed as the product of an orthogonal matrix Q and an upper triangular matrix R.

$$A = QR \quad (11)$$

$$Pd_{nr}(t) = f_{nr}(Sp_{nr}(t)) \quad (5)$$
$$= a_{nr1}Pd_{nr}(t-1) + a_{nr2}Pd_{nr}(t-2) + \ldots + a_{nrl}Pd_{nr}(t-1) +$$
$$b_{nr0} + b_{nr1}Sp_{nr}(t-1) + b_{nr2}Sp_{nr}(t-2) \ldots + b_{nrm}Sp_{nrm}(t-m) + e_{nrp}$$

$$Sp_{nr}(t) = g_{nr}(Pw_{nr}(t), Pd_{nr}(t)) \quad (6)$$
$$= c_{nr1}Sp_{nr}(t-1) + c_{nr2}Sp_{nr}(t-2) + \ldots + c_{nrx}Sp_{nr}(t-x) +$$
$$d_{nr0} + d_{nr1}Pw_{nr}(t-1) + d_{nr2}Pw_{nr}(t-2) + \ldots + d_{nrx}Pw_{nr}(t-y) +$$
$$p_{nr1}Pd_{nr}(t-1) + p_{nr2}Pd_{nr}(t-2) + \ldots + p_{nrx}Pd_{nr}(t-z) + e_{nrs}$$

The QR-decomposition of the matrix A can be computed by calculating the Householder reflection H for each column of A. The Householder reflection $H_k$ of the $k^{th}$ column can be calculated as:

$$s_k = \sqrt{a_{k,k}^2 + a_{k+1,k}^2 + \ldots + a_{n,k}^2} \quad (12)$$

$$w_k = \frac{1}{\sqrt{2s_k(s_k + |a_{k,k}|)}} \begin{bmatrix} 0 \\ \vdots \\ 0 \\ a_{k,k} + \text{sign}(a_{k,k})s_k \\ a_{k+1,k} \\ \vdots \\ a_{n,k} \end{bmatrix} \quad (13)$$

$$H_k = I - 2w_k w_k^T \quad (14)$$

where $a_{i,j}$ is the element of matrix A at the $i^{th}$ row and $j^{th}$ column, and n is the number of columns and I is the unity matrix.

The matrices Q and R can be calculated as $$Q = H_1 H_2 \ldots H_{n-1} \quad (15)$$

$$R = H_{n-1} H_{n-2} \ldots H_1 A \quad (16)$$

For a matrix A of m rows and n columns, where m is greater than n, the last m-n rows of the upper-triangular matrix R are completely zero.

Once the matrix A is expressed as A=QR, the LLS problem can be written as:

$$\begin{cases} Qy = b \\ Rx = y \end{cases} \quad (17)$$

Q is orthogonal, so $$y = Q^T b \quad (18)$$

With y and R known, x can be calculated. Since R is upper-triangular, this is simply done via backward substitution. By way of example, the solution is shown for a 3 by 3 matrix in the equation below.

$$\begin{bmatrix} r_{11} & r_{12} & r_{13} \\ r_{21} & r_{22} & 0 \\ r_{31} & 0 & 0 \end{bmatrix} \begin{bmatrix} x_1 \\ x_2 \\ x_3 \end{bmatrix} = \begin{bmatrix} y_1 \\ y_2 \\ y_3 \end{bmatrix} \quad (19)$$

This system can be solved via backward substitution starting at the bottom row.

$$r_{31} \cdot x_1 = y_3 \Rightarrow x_1 = y_3 / r_{31}$$

$$r_{21} \cdot x_1 + r_{22} \cdot x_2 = y_2 \Rightarrow x_2 = y_2 / r_{22} - r_{21} \cdot x_1 = y_2 / r_{22} - r_{21} \cdot y_3 / r_{31}$$

$$r_{11} \cdot x_1 + r_{12} \cdot x_2 + r_{13} \cdot x_3 = y_1 \Rightarrow x_3 = y_1 / r_{13} - r_{11} \cdot x_1 / r_{13} - r_{12} \cdot x_2 / r_{13} = y_1 / r_{13} - r_{11} \cdot y_3 / r_{31} / r_{13} - r_{12} \cdot (y_2 / r_{22} - r_{21} \cdot y_3 / r_{31}) \quad (20)$$

When using the QR-decomposition for solving a LLS problem, the orthogonal matrix Q is usually not explicitly calculated. Instead, R and y are calculated in a recursive algorithm, with initial conditions $$R = A$$

$$y = b \quad (21)$$

Next for each column of R, the vector w is calculated. With this vector, R and y are updated according to the following formulas.

$$R_k = R_k - 2(w_k^T R_k) w_k$$

$$y = y - 2(w_k^T y) w_k \quad (22)$$

where $R_k$ is the $k^{th}$ column of R. This is repeated for all columns of R. The solution of the LLS problem can then be calculated via backward substitution as described before.

4. Extraction of the Dynamic Models

The dynamic models (shown in Equations (5) and (6)) for the MBPC can be represented by the following equations:

$$\hat{P}d_{nr}(t) = \phi_{nrp}^T(t) \cdot \theta_{nrp} \quad (23)$$

$$\hat{S}p_{nr}(t) = \phi_{nrs}^T(t) \cdot \theta_{nrs} \quad (24)$$

where $\hat{P}d_{nr}$ and $\hat{S}p_{nr}$ are model predictive outputs, and $$\phi_{nrp}(t) = \begin{bmatrix} Pd_{nr}(t-1) \\ \vdots \\ Pd_{nr}(t-l) \\ 1 \\ Sp_{nr}(t-1) \\ \vdots \\ Sp_{nr}(t-m) \end{bmatrix} \text{ and } \theta_{nrp} = \begin{bmatrix} a_{nr1} \\ \vdots \\ a_{nrl} \\ b_{nr0} \\ b_{nr1} \\ \vdots \\ b_{nrm} \end{bmatrix}$$

$$\phi_{nrs}(t) = \begin{bmatrix} Sp_{nr}(t-1) \\ \vdots \\ Sp_{nr}(t-x) \\ 1 \\ Pw_{nr}(t-1) \\ \vdots \\ Pw_{nr}(t-y) \\ Pd_{nr}(t-1) \\ \vdots \\ Pd_{nr}(t-z) \end{bmatrix} \text{ and } \theta_{nrs} = \begin{bmatrix} c_{nr1} \\ \vdots \\ c_{nrx} \\ d_{nr0} \\ d_{nr1} \\ \vdots \\ d_{nry} \\ p_{nr1} \\ \vdots \\ p_{nrz} \end{bmatrix}$$

With the model structure defined above, given the model orders and a set of input and output data, the parameters of the model are found by minimizing a so-called loss function. An often-used loss function is the summed squared error:

$$J_N(\theta) = \frac{1}{N} \sum_{t=1}^{N} \varepsilon^2(t|\theta) \quad (25)$$

where N is the number of input and output samples and $\epsilon$ is the prediction error vector, defined as the difference between measured and predicted output:

$$\epsilon_{pd}(t|\theta) = Pd_{nr}(t) - \hat{P}d_{nr}(t|\theta) = Pd_{nr}(t) - \phi_{nrp}^T(t)\theta_{nrp} \quad (26)$$

$$\epsilon_{sp}(t|\theta) = Sp_{nr}(t) - \hat{S}p_{nr}(t|\theta) = Sp_{nr}(t) - \phi_{nrs}^T(t)\theta_{nrs} \quad (27)$$

For simplification, the matrix $\Phi$ and vector Y are used, defined as:

$$\Phi = \begin{bmatrix} \phi_{nrp}^T(1) \\ \phi_{nrp}^T(2) \\ \vdots \\ \phi_{nrp}^T(N) \end{bmatrix} \text{ or } = \begin{bmatrix} \phi_{nrs}^T(1) \\ \phi_{nrs}^T(2) \\ \vdots \\ \phi_{nrs}^T(N) \end{bmatrix} \quad Y = \begin{pmatrix} Pd_{nr}(1) \\ Pd_{nr}(2) \\ \vdots \\ Pd_{nr}(N) \end{pmatrix} \text{ or } = \begin{bmatrix} Sp_{nr}(1) \\ Sp_{nr}(2) \\ \vdots \\ Sp_{nr}(N) \end{bmatrix} \quad (28)$$

The loss function now becomes:

$$J_N(\theta) = |Y - \Phi\theta|^2 \quad (29)$$

where $\theta$ is equal to $\theta_{nrp}$ or $\theta_{nrs}$.

Minimizing this loss function can be accomplished by solving a linear least-squares problem.

5. Extraction of the Static Models

The parameters of the static models shown in Equation (4) are obtained by polynomial fitting using groups of input and output data. Thus, Equation (4) can be rewritten as:

$$Sp_n(k) = s_{n0} + s_{n1}Pd_n(k) + s_{n2}Pd_n(k)^2 + \ldots + s_{nq}Pd_n(k)^q \quad (30)$$

where k is the $k^{th}$ value of the input and output sequence.

The identification problem can now be formulated as follows. Given input and output signals $Sp_n = [Sp_n(1), Sp_n(2), \ldots, Sp_n(k)]^T$, $Pd_n = [Pd_n(1), Pd_n(2), \ldots, Pd_n(k)]^T$, and model order q, find appropriate values for parameters $S_n = [s_{nq}, \ldots, s_{n1}, s_{n0}]^T$. First a Vandermonde matrix V is constructed:

$$V = \begin{bmatrix} Pd_n(1)^q & \cdots & Pd_n(1) & 1 \\ \vdots & \ddots & \vdots & \vdots \\ Pd_n(k)^q & \cdots & Pd_n(k) & 1 \end{bmatrix} \quad (31)$$

Next, the parameters are estimated by solving the following least-squares problem.

$$\begin{bmatrix} Sp_n(1) \\ \vdots \\ Sp_n(k) \end{bmatrix} = \begin{bmatrix} Pd_n(1)^q & \cdots & Pd_n(1) & 1 \\ \vdots & \ddots & \vdots & \vdots \\ Pd_n(k)^q & \cdots & Pd_n(k) & 1 \end{bmatrix} \begin{bmatrix} s_{nq} \\ \vdots \\ s_{n0} \end{bmatrix} \quad (32)$$

which can be written as $$Sp_n = V \cdot S_n \quad (33)$$

Here the identification problem has become a linear least-squares problem, thus the parameters of a polynomial fit can be calculated as $$S_n = (V^T V)^{-1} V^T Sp_n \quad (34)$$

Alternatively, the QR decomposition algorithm can also be used to find the parameters for the polynomial fit.

Model validation can be provided by visual comparison of the measured and calculated model output, simulation, residual analysis, cross-correlation analysis, etc.

6. MBPC Structure

Figure 12:
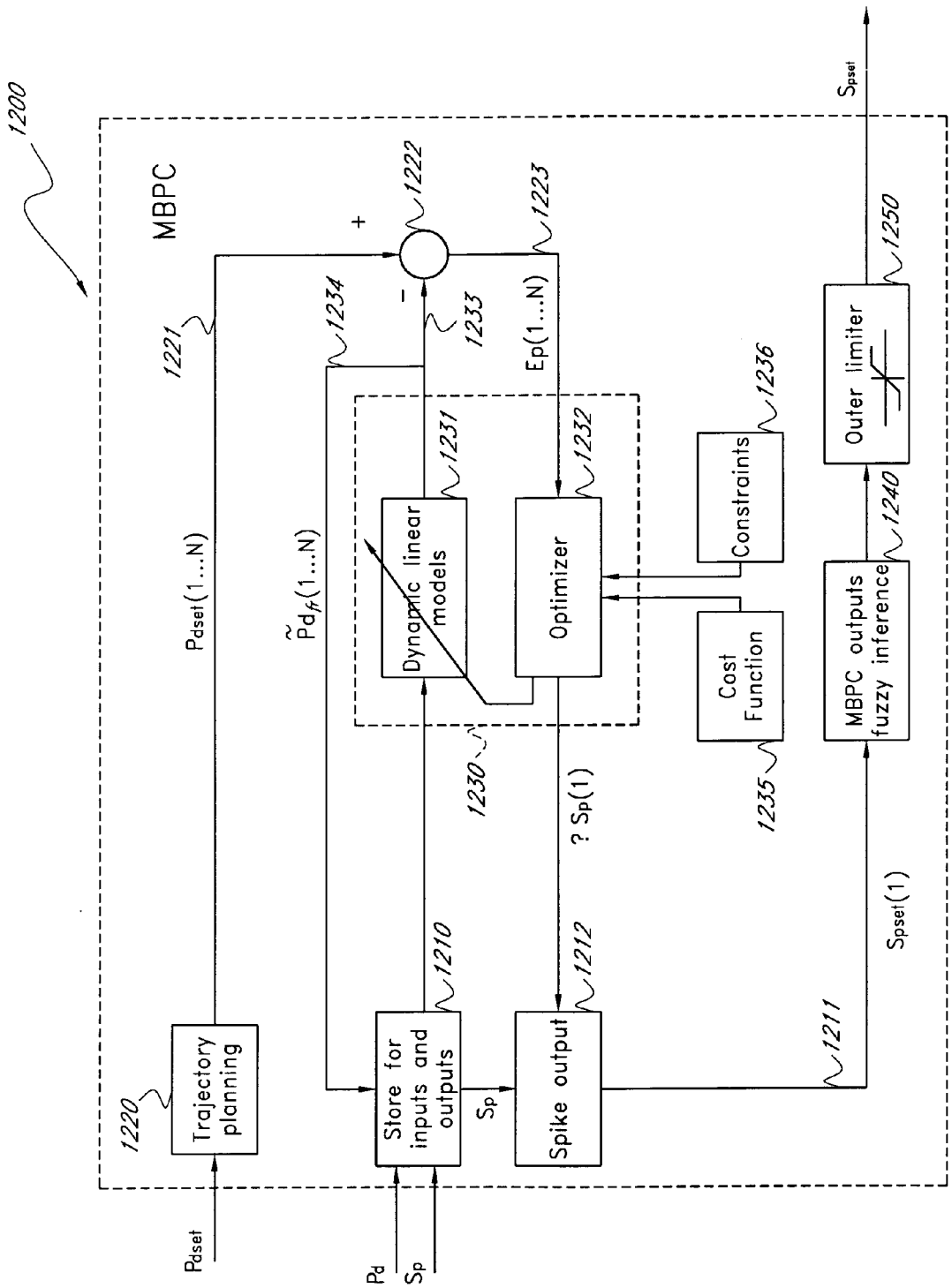
FIG. 12 shows the MBPC controller structure with a trajectory planner, a fuzzy inference engine, and a static model limiter.

The internal structure of one embodiment of an MBPC corresponding to the MBPC 520 from FIG. 5 is shown in more detail in FIG. 12 as an MBPC 1200. The MBPC 1200 includes an MBPC algorithm module 1230, a trajectory planning module 1220, an MBPC outputs fuzzy inference module 1240, and an MBPC static model limiter 1250. The MBPC algorithm module 1230 includes a modeling module 1231, which performs the actual modeling based on the dynamic model of Equation (5), and an optimizer module 1232.

Inputs to the MBPC controller 1200 are the paddle control setpoint temperature $Pd_{set}$ and the actual paddle temperatures $P_d$. The paddle control setpoint temperature is provided to the trajectory planning module 1220 and the actual paddle temperatures $P_d$ are provided to a memory 1210 for storing past inputs and outputs. The memory 1210 provides input to the MBPC algorithm module 1230. Additional input for the models include actual spike temperatures. The Trajectory planning module 1220 generates N paddle control setpoints $Pd_{set}(1 \ldots N)$ distributed over a predictive horizon, where $Pd_{set}(1)$ is the control setpoint for the present moment and $Pd_{set}(N)$ is the most future predicted control setpoint. These control setpoints $Pd_{set}(1 \ldots N)$ are provided to a first input of an adder 1222 via a line 1221. Further, the modeled paddle values $\tilde{Pd}_{fr}(1 \ldots N)$, which are provided as output by the MBPC control algorithm module 1230, are provided to a second input of the adder 1222 via a line 1233. The adder 1222 calculates error signals Es(1 \ldots N) which are provided to the Optimizer module 1232 of the MBPC algorithm module 1230 via a line 1223. The optimizer module 1232 optimizes the model output by minimizing a cost function 1235 as represented by equation (35), using constraints 1236. The least-squares error between the modeled predicted paddle control setpoint temperatures $\tilde{Pd}_{fr}(1 \ldots N)$ and the actual paddle control setpoint temperatures $Pd_{set}(1 \ldots N)$ from the trajectory planner 1220 is minimized over the predictive horizon. The predicted paddle control setpoint temperatures are optimized by using the disturbance model (the last term in equation (35)) so that the predictive values approach the actual values.

The spike correction value $\Delta Sp$ is calculated, according to equation (45). The modeled values $\tilde{Pd}_{fr}(1 \ldots N)$ are provided to the memory 1210 via a line 1234. The spike correction value $\Delta Sp$ is provided from the MBPC algorithm into a spike output calculation module 1212 to calculate the modeled spike control setpoint $Sp_{set}(1)$ according to equation (46). The modeled spike control setpoint $Sp_{set}(1)$ is provided to the MBPC outputs fuzzy inference module 1240 via a line 1211. The modeled spike control setpoint value is provided to the Output limiter 1250 where the output is limited according to equation (54). The algorithms will be discussed in further detail below.

Based on the dynamic linear models described in Equation (5), the predictive control algorithm calculates the control strategy $\Delta Sp_{set}(t)$ by minimizing the cost function J, defined as:

$$J = \sum_{k=1}^{N} k_u \left[ Pd_{set}(t+k) - \tilde{Pd}(t+k \mid t) \right]^2 + \sum_{k=1}^{N_u} k_s [\Delta Sp(t+k-1)]^2 \quad (35)$$

where N and $N_u$ are the prediction horizon, $k_u$ and $k_s$ are weight parameters, and $Pd_{set}(t+k)$ is the $k^{th}$ paddle control setpoint generated by the trajectory planner. Further, $\tilde{Pd}(t+k|t)$ is the $k^{th}$ model predictive output at time t, which can be considered as the combination result of two separate contributions:

$$\tilde{Pd}(t+k|t) = \tilde{Pd}_{fr}(t+k|t) + \tilde{Pd}_{fo}(t+k|t) \quad (36)$$

where $\tilde{Pd}_{fr}(t+k|t)$ is the free response, and $\tilde{Pd}_{fo}(t+k|t)$ is the forced response. Among them, $\tilde{Pd}_{fr}(t+k|t)$ can be computed directly from Equation (6) as:

$$\tilde{Pd}_{fr}(t+k|t) = \sum_{i=1}^{l} a_i Pd(t-i+k|t) + \sum_{j=0}^{m} b_j Sp(t-j+k|t) + \sum_{r=l}^{n} d_r e(t-r+k|t) \quad (37)$$

where $$\sum_{r=l}^{n} d_r e(t-r+k|t)$$

is the disturbance model output, and $$e(t) = [Pd(t) - \tilde{Pd}_{fr}(t)] - [Sp_{set}(t-1) - Sp(t)].$$

Then, $\tilde{Pd}_{fo}(t+k|t)$ can be calculated as:

$$\tilde{Pd}_{fo}(t+k|t) = \sum_{i=0}^{N_u-1} g_{k-i} \Delta Sp(t+i|t) \quad (38)$$

where $g_i$ is the coefficient of the module step response of the model from Equation (5), which can be obtained as:

$$g_i = \sum_{j=1}^{i} a_j g_{i-j} + \sum_{j=0}^{i-1} b_j \quad g_k = 0 \text{ when } k \le 0 \quad (39)$$

where $a_j$ and $b_j$ are the coefficients from Equation (5).

By using matrix notation, Equations (38), (36) and (35) can be rewritten as:

$$\tilde{Pd}_{fo} = G\Delta Sp \quad (40)$$

$$\tilde{Pd} = \tilde{Pd}_{fr} + \tilde{Pd}_{fo} \quad (41)$$
$$= \tilde{Pd}_{fr} + G\Delta Sp$$

$$J = k_u (Pd_{set} - \tilde{Pd})^T (Pd_{set} - \tilde{Pd}) + k_s \Delta Sp^T \Delta Sp \quad (42)$$
$$= k_u [(Pd_{set} - \tilde{Pd}_{fr}) - G\Delta Sp]^T [(Pd_{set} - \tilde{Pd}_{fr}) - G\Delta Sp] + k_s \Delta Sp^T \Delta Sp$$

Minimizing J with respect to $\Delta Sp$, i.e., $$\frac{\partial J}{\partial (\Delta Sp)} = 0,$$

then $\Delta Sp$ gives the optimal solution:

$$\Delta Sp = (k_u G^T G + k_s I)^{-1} G^T k_u (Pd_{set} - \tilde{Pd}_{fr}) \quad (43)$$

where I is a identity matrix, and the matrix $(k_u G^T G + k_s I)$ to be inverted has $N_u \times N_u$ dimension. The value of $N_u$ need not be 1, but it is instructive to note that when $N_u = 1$, then Eq. (43) is simplified as the scalar control law:

$$\Delta Sp(t|t) = \frac{k_u \sum_{k=1}^{N} g_k [Pd_{set}(t+k|t) - \tilde{Pd}_{fr}(t+k|t)]}{\sum_{k=1}^{N} k_u g_k^2 + k_s} \quad (44)$$

Substitute Eq. (39) into (44), then:

$$\Delta Sp(t|t) = \quad (45)$$
$$\frac{k_u \sum_{k=1}^{N} \left( \sum_{j=1}^{k} a_j g_{i-j} + \sum_{j=0}^{k-1} b_j \right) [Pd_{set}(t+k|t) - \tilde{Pd}_{fr}(t+k|t)]}{k_u \sum_{k=1}^{N} \left( \sum_{j=1}^{k} a_j g_{i,j} + \sum_{j=0}^{k-1} b_j \right)^2 + k_s}$$

In one embodiment, the MBPC employs a "receding horizon" control principle, where only the first element $\Delta Sp(t|t)$ is required to compute the MBPC output:

$$Sp_{set}(t) = Sp_{set}(t-1) + \Delta Sp(t|t) \quad (46)$$

At the next sampling instant (t+1), the whole procedure is repeated.

6.2 Trajectory Planning

Figure 14:
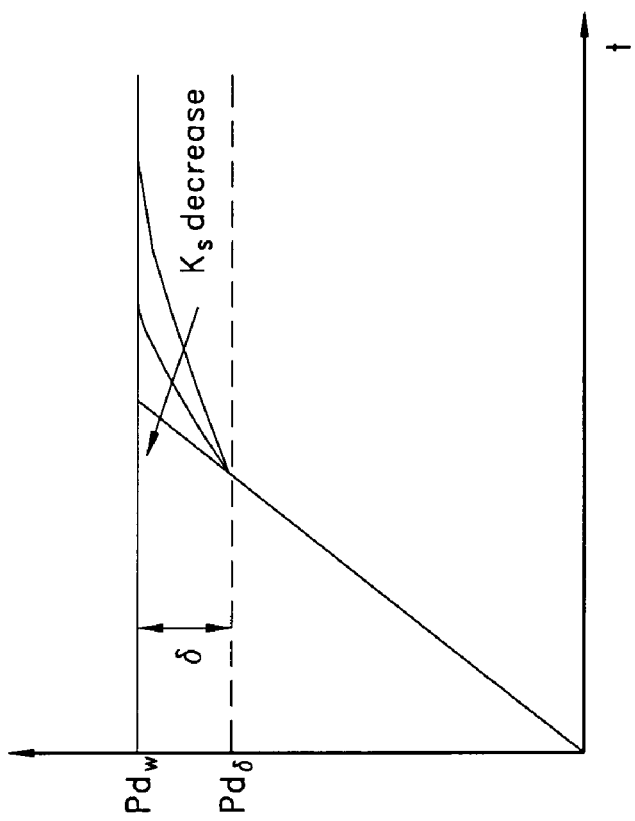
FIG. 14 is a graph showing the temperature control setpoint generating principle used by the paddle TC control setpoint trajectory planner.

To control the desired speed to approach the paddle TC control setpoint, a trajectory planer is used. In one embodiment, the trajectory planner reduces the ramp rate when the actual paddle temperature Pd approaches the desired paddle control setpoint $Pd_w$ to within a range $\delta$:

$$Pd_{set}(t+k) = \begin{cases} Pd_{set}(t+k-1) + r_p & Pd \le Pd_\delta = Pd_w - \delta \\ Pd_{set}(t+k-1) + (1-\alpha)r_p & Pd > Pd_\delta \end{cases} \quad (47)$$

where $r_p$ is the desired ramp rate, $\delta$ is the stabilization range and $\alpha$ is the trajectory reference time constant. An example trajectory reference is shown in FIG. 14. Both $\delta$ and $\alpha$ are related to, and depend on, the ramp rate $r_p$, and are separately defined as:

$$\delta = k_r r_p \in [\delta_{min}, \delta_{max}] \text{ and } k_r < 1 \quad (48)$$

$$\alpha = k_s + \frac{r_p}{Pd_w - Pd_{set}(t+k-1)} < 1 \quad (49)$$

where $k_r$ is a proportional constant, and $k_s$ is a constant for the stabilization time control that is also used in the control law in Equation (44).

The parameters $\delta$ and $\alpha$ can be selected and adjusted to provide optimum control under a variety of circumstances by setting the values of the constants $k_r$ and $k_s$. It can be seen from FIG. 14 that by tuning $k_s$, different trajectories are achieved, which provides a natural way to control the aggressiveness of the controller. Increasing $k_s$ is analogous to increasing $\alpha$, which leads to a slower but more robust controller. Thus, $k_s$ is a more direct and intuitive tuning parameter for system stabilization than $\alpha$. Similarly, $k_r$ is a more direct and intuitive tuning parameter for system stabilization than $\delta$.

6.3 MBPC Outputs Inference by Using Fuzzy Logic

During controlling temperature ramp up/down to a desired temperature level, the temperatures may cross several different temperature sub-ranges, particularly, when the temperature is close to the defined edges of a temperature sub-range. The MBPC needs to switch from the dynamic models that are valid for one temperature sub-range to the dynamic models that are valid for another, adjacent, temperature sub-range. In one embodiment, a fuzzy logic software algorithm is used to ensure that the MBPC controller has a smooth transition of its outputs, without introducing disturbances into the control system when it needs to switch between the models.

Figure 15:
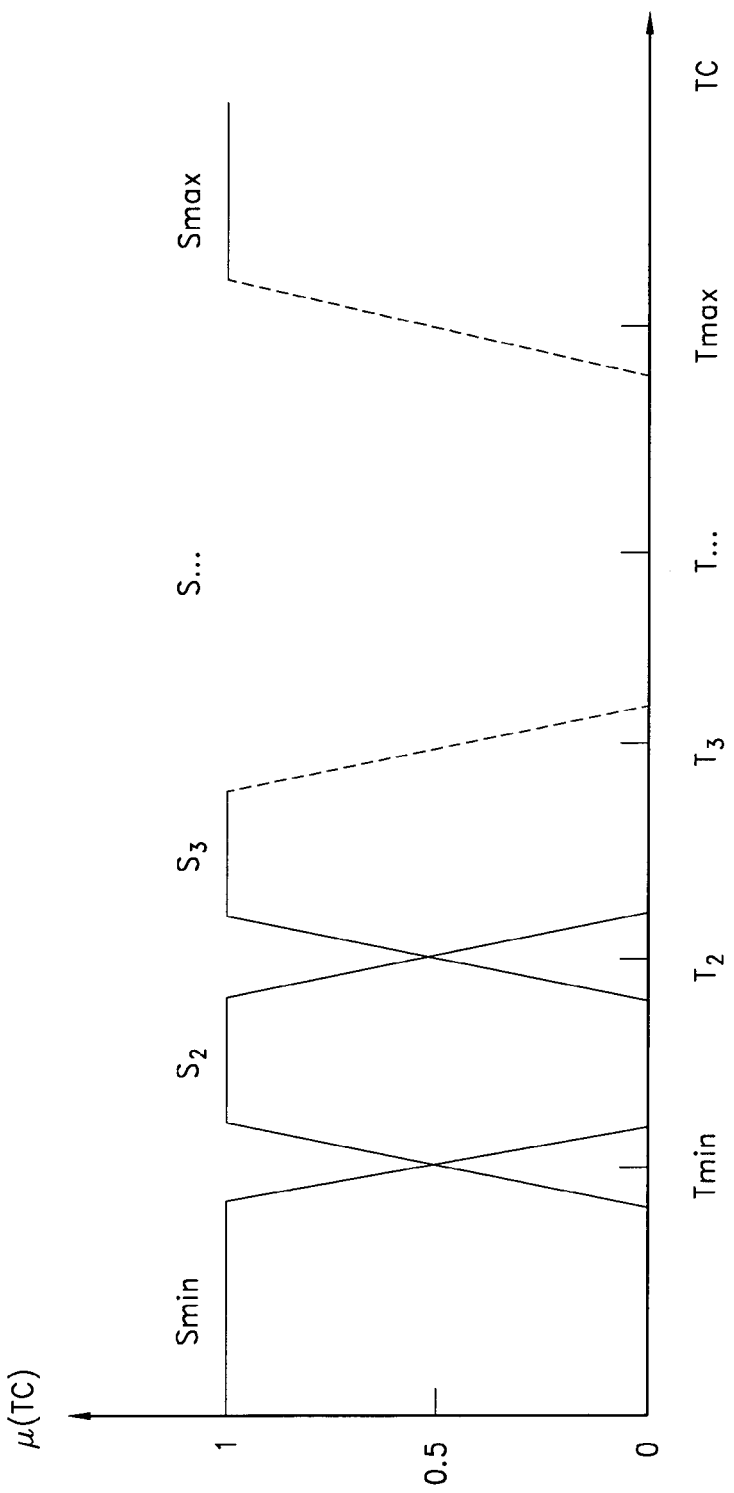
FIG. 15 shows the definitions of the fuzzy sets that are used for the fuzzy inference engine for smoothing transition between multiple dynamic model outputs.

The fuzzy sets are defined as shown in FIG. 15. According to Takagi/Sugeno fuzzy rule format, the fuzzy rules are written as:

$R_1$: IF paddle TC is in temperature sub-range $S_{min}$ Then $Sp^1_{set}(t) = Sp_{r1}(t)$
ALSO
$R2$: IF paddle TC is in temperature sub-range $S_2$ Then $Sp^2_{set}(t) = Sp_{r2}(t)$
ALSO
. . .
ALSO
$R_m$: IF paddle TC is in temperature sub-range $S_{max}$ Then $Sp^m_{set}(t) = Sp_{rm}(t)$ where, $S_{min}, S_2, \ldots, S_{max}$ are fuzzy sets defined in FIG. 15, $Sp_{rm}$ are the crisp values of MBPC outputs Equation (46) from the different models.

By using fuzzy inference and a center of area (COA) defuzzification operator, the outputs of the MBPC are calculated as:

$$Sp^n_{set}(t) = \frac{\sum_{i=1}^{m} \mu_i(R_i) Sp^i_{set}(t)}{\sum_{i=1}^{m} \mu_i(R_i)} \tag{50}$$

where n is the zone number, m is the fuzzy rule number, $Sp_{set}^n(t)$ is the spike control setpoint for zone n, $\mu_i$(i=1, 2, . . . , m) are the fuzzy membership functions that are defined in FIG. 10 and can be mathematically described as:

$$\mu_1(Sp_{set}) = \begin{cases} 1 & Sp_{set} \in (0, T_{min} - \Delta T) \\ \frac{T_{min} + \Delta T - Sp_{set}}{2\Delta T} & Sp_{set} \in [T_{min} - \Delta T, T_{min} + \Delta T] \\ 0 & Sp_{set} \in (T_{min} + \Delta T, +\infty) \end{cases} \tag{51}$$

where $[T_{min}, T_{max}]$ is the desired temperature control range, $\Delta T$ is a parameter that characterizes the membership functions.

$$\mu_2 = \ldots = \mu_j(Sp_{set}) = \tag{52}$$

$$\begin{cases} 0 & Sp_{set} \in (0, T_{j-1} - \Delta T) \\ \frac{Sp_{set} - (T_{j-1} - \Delta T)}{2\Delta T} & Sp_{set} \in [T_{j-1} - \Delta T, T_{j-1} + \Delta T] \\ 1 & Sp_{set} \in [T_{j-1} + \Delta T, T_j - \Delta T] \\ \frac{(T_j + \Delta T) - Sp_{set}}{2\Delta T} & Sp_{set} \in [T_j - \Delta T, T_j + \Delta T] \\ 0 & Sp_{set} \in (T_j + \Delta T, +\infty) \end{cases}$$

where j=2, . . . , m−1 are the sub-temperature control ranges, and $T_1 = T_{min}$.

$$\mu_m(Sp_{set}) = \begin{cases} 0 & Sp_{set} \in (0, T_{max} - \Delta T) \\ \frac{Sp_{set} - (T_{max} - \Delta T)}{2\Delta T} & Sp_{set} \in [T_{max} - \Delta T, T_{max} + \Delta T] \\ 1 & Sp_{set} \in (T_{max} + \Delta T, +\infty) \end{cases} \tag{53}$$

6.4 MBPC Output Limiters

Figure 20:
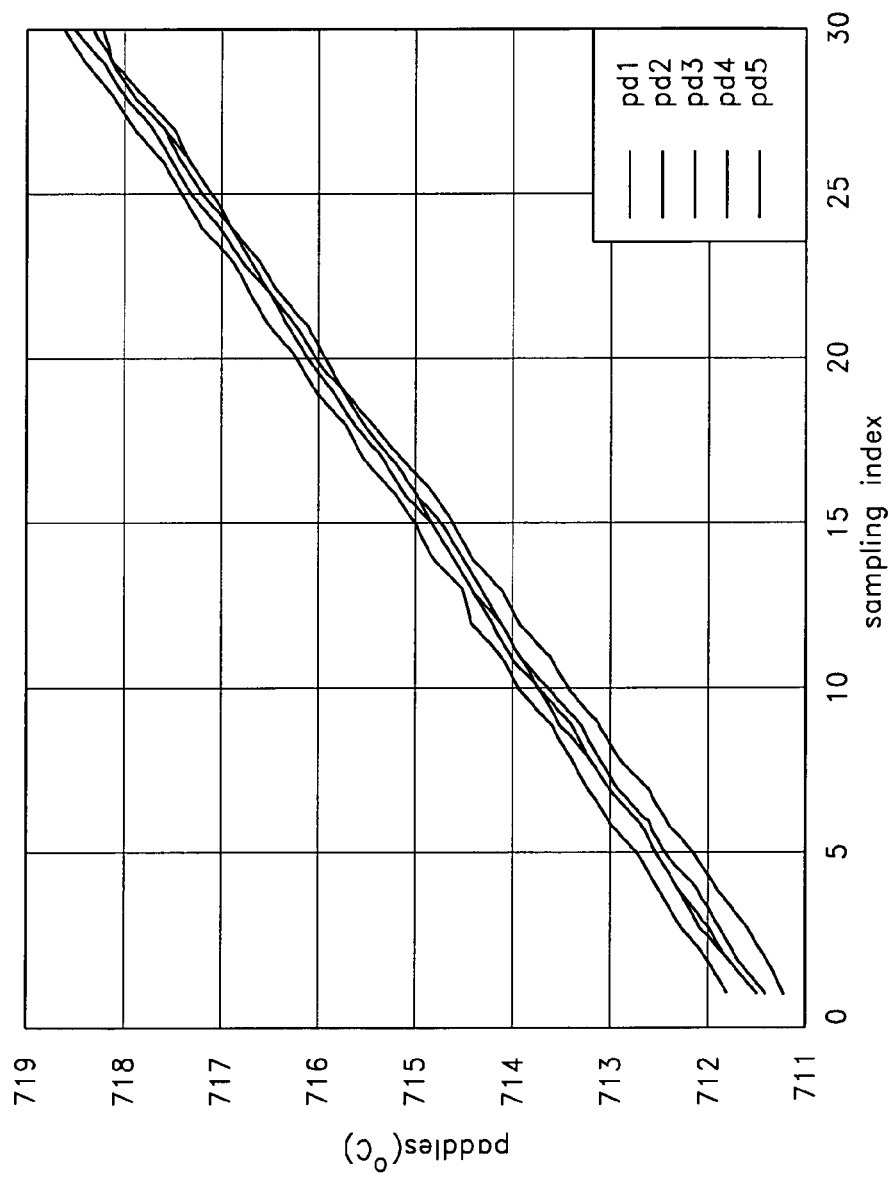
FIG. 20 is a graph showing the temperature uniformity during ramp-up.

The hybrid cascade MBPC and PID control scheme has an important advantage over single loop systems in that it reduces the disturbance effects of inner-loop process variability. However, such a scheme also presents some conceptual difficulties, and can result in poorer dynamic performance if the inner loop PID is not fast enough to follow the control setpoint generated by the MBPC. Moreover, model mismatches can appear in cases where the reactor system is changed or disturbed (e.g., boat in/out, when the door of the reactor is open, different ramp rates and load sizes, etc.). In these cases, the conceptual difficulties arise from the fact that the MBPC needs to know its control effort limits in order to function properly. To deal with these difficulties, limiters based on static models are added to the MBPC control loop. The limiters are defined as:

$$Sp^n_{set}(t) = \begin{cases} Sp^{min}_{set} & Sp^n_{set}(t) < Sp^{min}_{set} = -|Sp_n(t) + k_u \Delta T| \\ Sp^n_{set}(t) & -|Sp_n(t) + k_u \Delta T| \leq Sp^n_{set} \leq |Sp_n(t) + k_u \Delta T| \\ Sp^{max}_{set} & Sp^n_{set}(t) > Sp^{max}_{set} = |Sp_n(t) + k_u \Delta T| \end{cases} \tag{54}$$

where $Sp_n$ is computed by Equation (30), $\Delta T$ is an adjustable temperature constant for compensation of the model outputs mismatches, and $k_u$ is a tuning parameter that is also used in the control law Equation (45). Tuning $k_u$, can improve the temperature uniformity (shown in FIG. 20).

Figure 16:
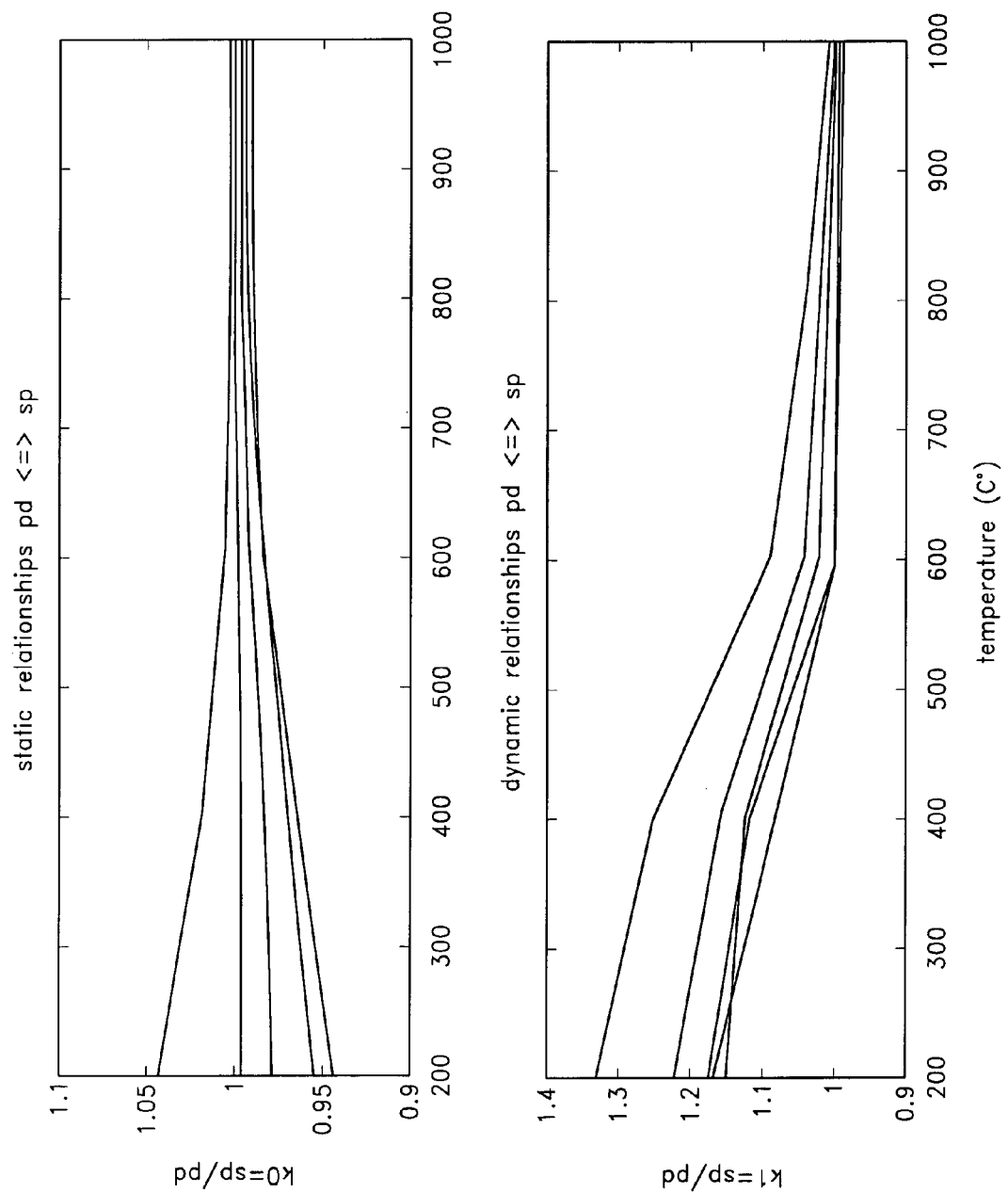
FIG. 16 shows the dynamic and static relationships between the paddle TC and the spike TC, which illustrates the non-linearity of the vertical thermal reactor.

It can be seen from FIG. 16 that both dynamic and static relationships between the paddle TCs and the spike TCs are changed with the different temperature levels. The dynamic relationships are different from the static relationships, especially for lower temperature ranges. These differences result from the temperature non-linearity of the thermal reactor.

By using Equation (54), some uncertain factors caused by the system non-linearity and disturbances are limited in the MBPC control loop, which ensures that the MBPC can always generate the reasonable control setpoints for the inner PID control loop, enhances the stability, control margins and robustness of the hybrid cascade MBPC control system.

7. PID Design

Figure 13:
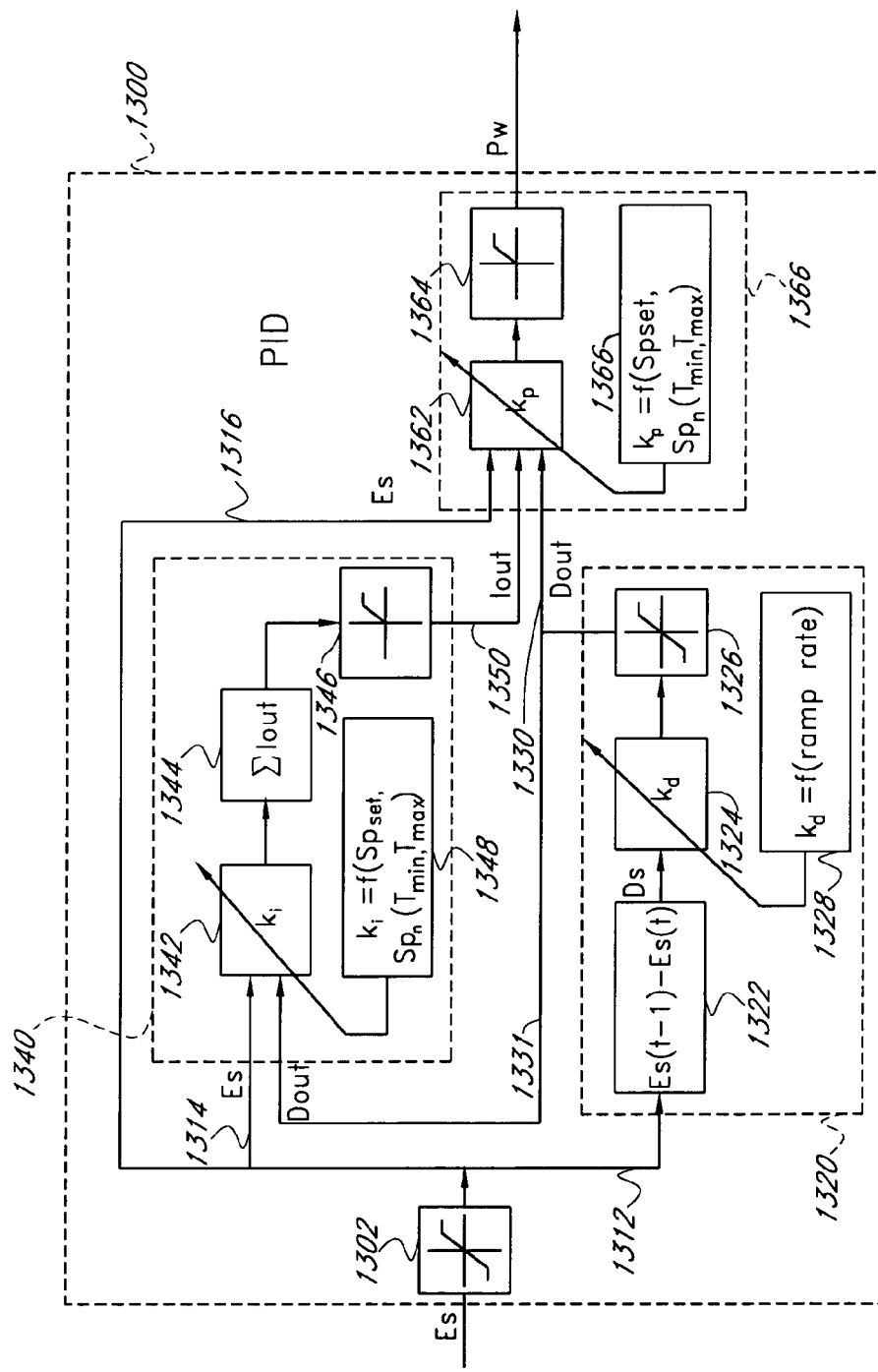
FIG. 13 shows the PID controller structure with an auto-tuner and an anti wind-up module.
Figure 18:
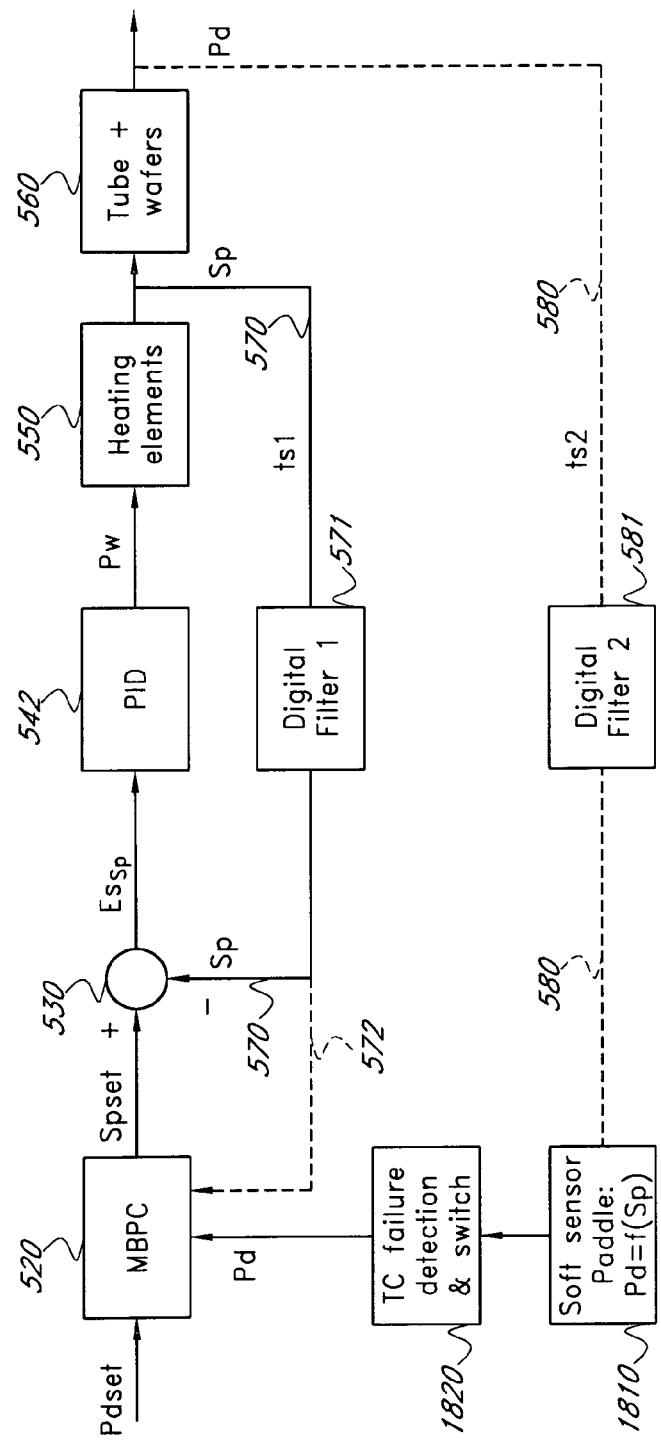
FIG. 18 shows a safety control configuration 1, wherein a software signal based on spike TC input replaces the signal from a failing paddle TC.
Figure 19:
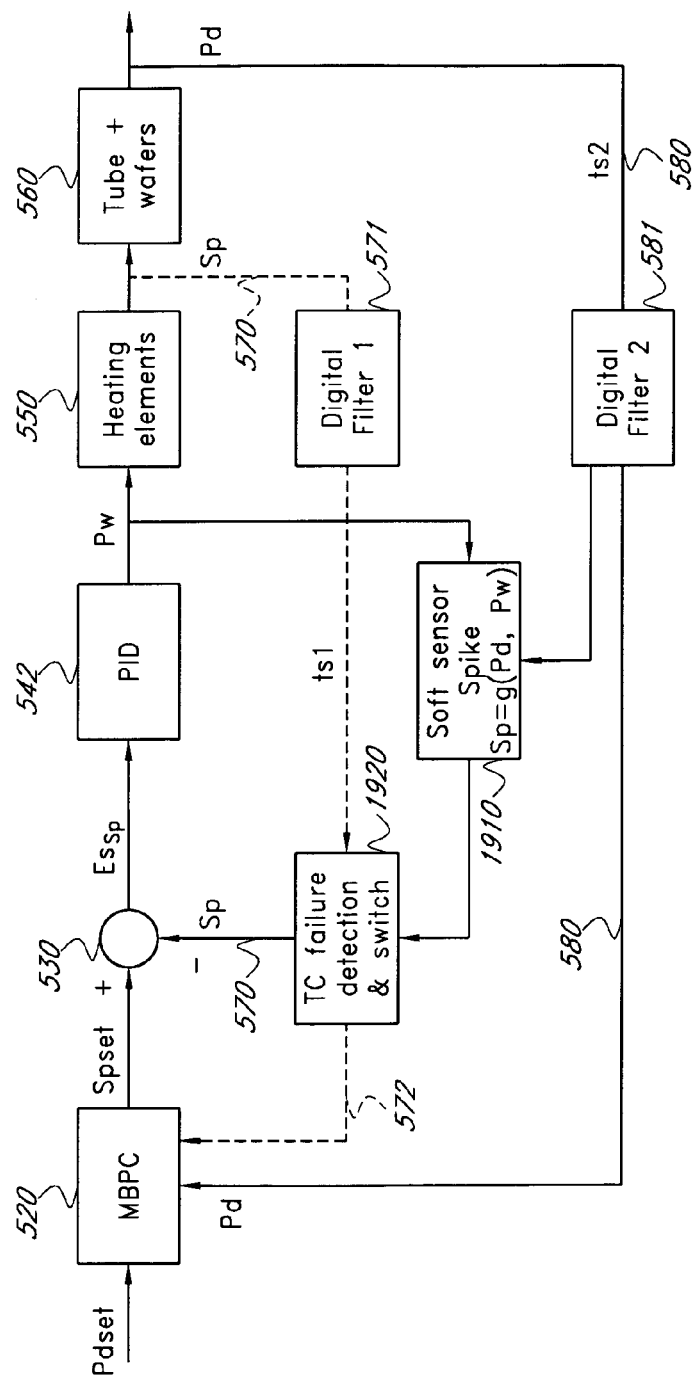
FIG. 19 is a safety control configuration 2, wherein a software signal based on a paddle TC input signal and power control signal replaces the signal from a failing spike TC.

The PID loop is an inner control loop that works in concert with the outer MBPC control loop. Tuning parameters (e.g., control gains) of the PID controller are based on the accumulated control experiences and the open-loop identification analysis of the vertical thermal reactor. The PID controller is used for both modeling (FIG. 8) and normal control (FIGS. 6, 18 19). Its structure is shown in FIG. 13. The PID algorithm is mathematically represented by:

$$Pw(t) = \frac{1}{\delta}\{E_s(t) + Iout(t) + Dout(t)\} \times G \quad (55)$$

$$= \frac{1}{\delta}\left\{E_s(t) + \frac{T_s}{T_i}\sum_{j=0}^{t}\left[E_s(t) + \frac{T_d}{T_s}D_s(t)\right]_j + \frac{T_d}{T_s}D_s(t)\right\} \times G$$

$$= k_p(t)\left\{E_s(t) + k_i(t)\sum_{j=0}^{t}[E_s(t) + k_d(t)D_s(t)]_j + k_d(t)D_s(t)\right\} \times G$$

where:
Pw(t)=power output
δ=proportional band
$E_s(t)=Sp_{set}(t)-Sp(t)$=spike error
$Sp_{set}(t)$=spike setpoint
Sp(t)=spike sampling temperature
$T_s$=sampling period (1 second)
$T_i$=integral time constant
$T_d$=differential time constant
$D_s(t)=Sp(t-1)-Sp(t)$=spike TC change rate
G=General gain for special power control The first, second and third terms on the right-hand side of Equation (55) represent the proportional, integrative and differentiating actions respectively.

The structure of a PID controller 1300 is shown in FIG. 13 and reflects the structure of Equation (55). In the PID controller 1300, an error signal Es is provided to a limiter 1302, mathematically represented by equation (57) below. After passing through the limiter 1302, the limited error signal is provided to a differentiating action module 1320 via a line 1312, to an integrating action module 1340 via a line 1314, and to a proportional action module 1360 via a line 1316. In the differentiating module 1320, the rate of error signal change is determined in block 1322. Then the differentiating action is calculated in block 1324 using a $k_d$ value, which is variable and calculated in block 1328. The calculated differentiating action passes the output limiter 1326, mathematically represented by Equation (59).

In the integrating action module 1340, an integration constant $k_i$ is calculated in block 1348 and applied in block 1342. A summation is carried out in block 1344. Then the calculated integrating action passes through the output limiter 1346, mathematically represented by Equation (58). In one embodiment, the output of the differentiating action module, Dout, is also used as an input for calculating the integrating action, as shown by feedback line 1331. The purpose of this feedback is to achieve improved control during ramp-up and ramp-down. The outputs of both the differentiating action module 1320 and the integrating action module 1340 are provided to the proportional action module 1360 via lines 1330 and 1350, respectively. In the proportional action module 1360, the proportionality action is calculated in block 1362, using a proportionality constant $k_p$ calculated in block 1366. Then the output signal Pw passes through output limiter 1364, represented by Equation (60).

The PID parameters $k_d$, $k_i$ and $k_p$ are calculated in blocks 1328, 1348 and 1366 according to the formulas:

$$k_d(t) = \frac{r_d(t)T_{ds}(t)}{T_s} \quad (56)$$

$$k_i(t) = k_{i\_max}k_{i\_min} \times (T_{max} - Sp_{set}(t)) \quad T_{min} \leq Sp_{set}(t) \leq T_{max}$$

$$k_p(t) = k_{p\_max}k_{p\_min} \times (T_{max} - Sp_{set}(t)) \quad T_{min} \leq Sp_{set}(t) \leq T_{max}$$

where:

$$k_{p\_max} = k_{p0} + k_{p1} \times \left(\frac{Sp_n(T_{max})}{T_{max}} - k_{p2}\right)$$

$$k_{p\_min} = \frac{k_{p\_max} - \left(k_{p0} + k_{p1} \times \left(\frac{Sp_n(T_{min})}{T_{min}} - k_{p2}\right)\right)}{T_{max} - T_{min}}$$

$$k_{i\_max} = k_{i0} + k_{i1} \times \left(\frac{Sp_n(T_{max})}{T_{max}} - k_{i2}\right)$$

$$k_{i\_min} = \frac{k_{i\_max} - \left(k_{i0} + k_{i1} \times \left(\frac{Sp_n(T_{min})}{T_{min}} - k_{i2}\right)\right)}{T_{max} - T_{min}}$$

where $Sp_{set}(T)$ is calculated by using the static model according to Equation (3), and $k_{p0}$, $k_{p1}$, $k_{p2}$, $k_{i0}$, $k_{i1}$, and $k_{i2}$ are predetermined constants relating to system gain and time constants. Tds is a delay time. $T_{min}$ and $T_{max}$ are the lower and upper temperature boundaries of the temperature control range. After dynamic and static models are identified, the $k_{p\_max}$, $k_{p\_min}$, $k_{i\_max}$, $k_{i\_min}$ and Tds can be re-determined and modified by performing an analysis of both the dynamic and static models. For a given thermal reactor, these parameters can be predetermined in the design and development phase without additional on-line tuning for individual reactors after manufacturing or during use.

For anti-wind-up and integral saturation, the following linear limiters are included in the PID controller 1300, and defined as:

$$E_s(t) = \begin{cases} Es\_min & Es(t) < Es\_min \\ Es(t) & Es\_min \leq Es(t) \leq Es\_max \\ Es\_max & Es(t) > Es\_max \end{cases} \quad (57)$$

$$Iout(t) = \begin{cases} Iout\_min & Iout(t) < Iout\_min \\ Iout(t) & Iout\_min \leq Iout(t) \leq Iout\_max \\ Iout\_max & Iout(t) > Iout\_max \end{cases} \quad (58)$$

$$Dout(t) = \begin{cases} Dout\_min & Dout(t) < Dout\_min \\ Dout(t) & Dout\_min \leq Dout(t) \leq Dout\_max \\ Dout\_max & Dout(t) > Dout\_max \end{cases} \quad (59)$$

$$Pw(t) = \begin{cases} Pw\_min & Pw(t) < pw\_min \\ Pw(t) & Pw\_min \leq Pw(t) \leq Pw\_max \\ Pw\_max & Pw(t) > Pw\_max \end{cases} \quad (60)$$

Figure 17:
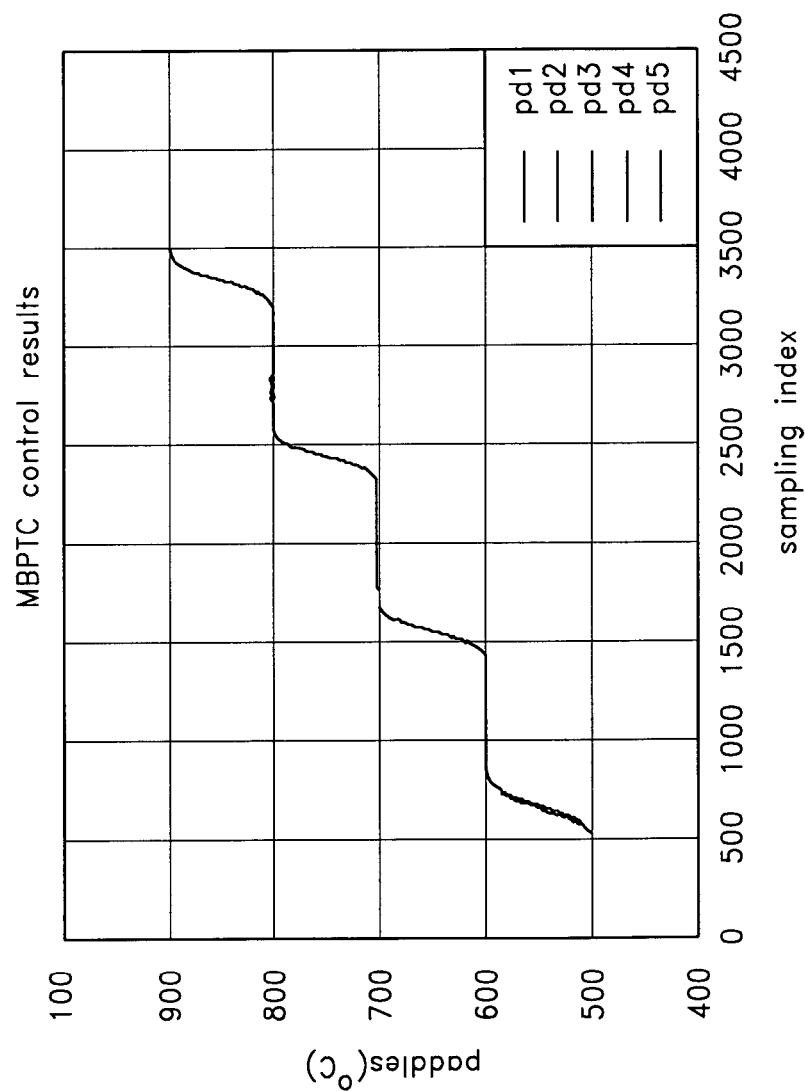
FIG. 17 shows typical control results of a hybrid cascade MBPC and PID controller, demonstrating that in various temperature controlled ranges both ramp up uniformity and steady-state temperature variations are relatively small.

By using Equations (57)–(60), the dynamic response of the inner-loop PID is stable and provides the desired speed of response. The control results are shown in FIG. 17. The model used was derived from modeling data sets in FIG. 9 and FIG. 10. The design of the outer loop MBPC based on the dynamic models derived from the closed-loop data controlled by the PID controller greatly increases the temperature system control margins and stability as can be observed by comparing FIGS. 10 and 17. Although in both figures the inner spike loop has been active, in FIG. 10 the outer loop is "open" or inactive and in FIG. 17 the outer loop is closed, or active.

It can be seen from FIG. 1 that the control system has two groups of temperature measurement sensors: 1) paddle TC; and 2) spike TC. In one embodiment, each group includes five sampling circuits, each circuit corresponding to a specific heating zone. During the batch process, the software detectors in the temperature control system monitor the TC measurements and determine whether there are failures or not. If one or more TC hardware failures are detected, then the control logic switches the TC input(s) from real sampling measurements to corresponding soft-computing values that are calculated based on dynamic models in Equations (5) or (6). Using the soft-sensors, the soft-sensor temperature control quality is substantially equivalent to the normal temperature control, which prevents the reactor operation from shutdown due to TC measurement hardware failures. The process under the procedure can continue without the loss of the whole batch process.

The MBPC safety control configuration for paddle TC failure is shown in FIG. 18 which is similar to FIG. 6, with similar parts indicated with similar reference numerals. Additionally, FIG. 18 shows a soft-sensor paddle 1810 that models paddle temperatures based on spike temperatures. Further a TC failure detection module and switch 1820 are provided. When a failure of a paddle TC is detected, the actual paddle temperature for that paddle TC is no longer provided as input to the adder 510, but the modeled paddle temperature, based on the spike values, is used.

Similarly, the MBPC safety control configuration for spike TC failure is shown in FIG. 19. FIG. 19 shows a Soft sensor spike 1910, which models a spike temperature based on paddle temperature Pd and power output Pw. Further, a TC failure detection and switch 1920 is provided. When a failure is detected for a spike TC, the actual spike temperature for that TC is no longer provided as input to the adder 530 and to the MBPC controller 520, but instead the modeled spike temperature is used for that purpose.

9. MBPC Parameter Tuning

Figure 21:
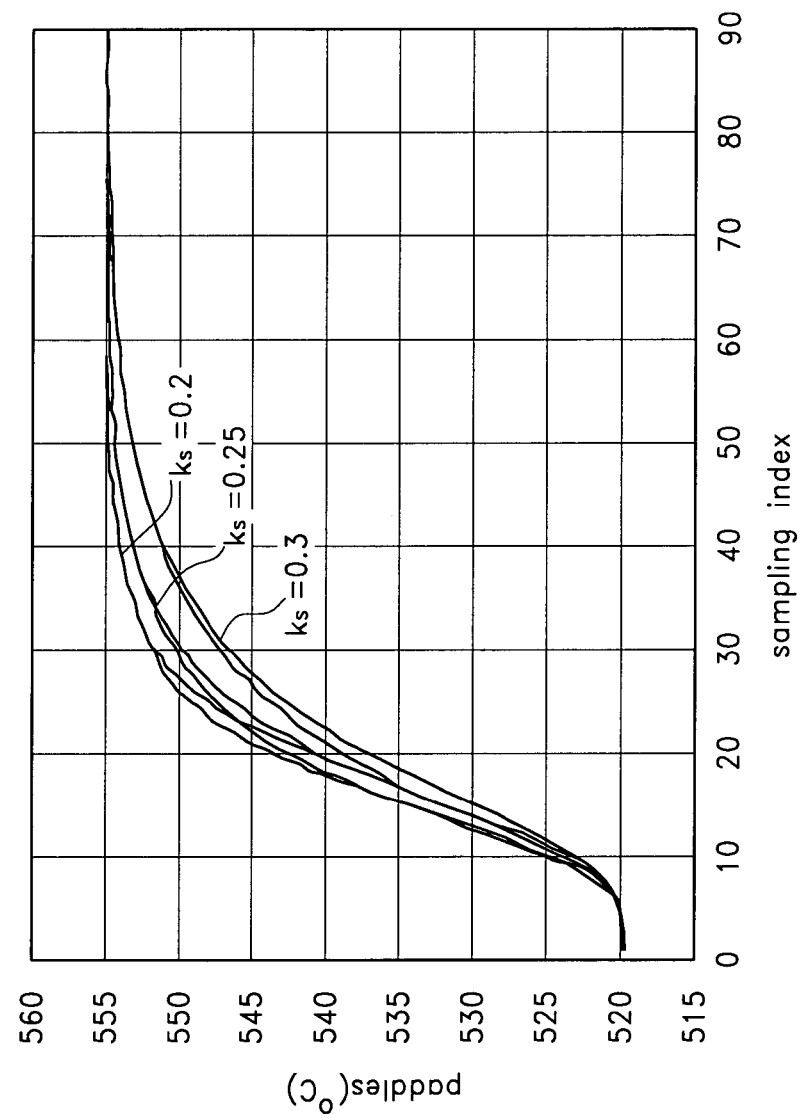
FIG. 21 is a graph showing the influence of the MBPC controller parameter $K_s$ for achieving different system stabilization times.

The presence of the inner-loop PID control with outer-loop MPBC control makes the control system robust such that in many cases parameters tuning only needs to be performed during the design phase. For small changes in the furnace system, additional parameter tuning can be omitted in many cases. Since both the dynamic and static models are derived from the closed-loop data controlled by the inner-loop PID controller, slowing down or speeding up the inner-loop does not seriously degrade the performance of the outer MBPC loop. In this case, the inner and outer loop tuning are not strongly coupled. In the design of the inner loop, parameter tuning can be realized automatically (shown in Equation (56)). For control flexibility, in the outer MBPC loop design, two parameters ($k_u$ and $k_s$) are provided for the adjustment of the dynamic ramp-up temperature uniformity (shown in FIG. 20) and the stabilization time (shown in FIG. 21). Both $k_u$ and $k_s$ are embedded into the control law expressed by Equation (45). Further, $k_u$ is also included in the MBPC output limiters Equation (54) and $k_s$ in the trajectory planner Equation (49). Both $k_u$ and $k_s$ behave like time constants. Thus increasing/decreasing $k_u$ or $k_s$ is analogous to changing the control system time constants, which causes the system response to slow down or to speed up. The main effect of $k_u$ is on dynamic temperature uniformity during ramp-up or ramp-down, and the main effect of $k_s$ is on stabilization time control. The tuning rules can be summarized and simplified as:

Increase $k_u$, the ramp up rate slows down;
Decrease $k_u$, the ramp up rate speeds up;
Increase $k_s$, the stabilization time becomes longer;
Decrease $k_s$, the stabilization time becomes shorter.

Although the present invention has been described with reference to a specific embodiment, other embodiments occur to those skilled in the art. For example, the hybrid cascade MBPC can be used to control many linear and/or non-linear plants, not just the vertical thermal process reactor. It is to be understood therefore, that the invention herein encompasses all such embodiments that do not depart from the spirit and scope of the invention as defined in the appended claims.

What is claimed is:

1. A temperature control system for a thermal reactor having a process chamber, the control system comprising:
    a first control loop comprising a conventional controller and using a spike temperature sensor signal as input for the conventional controller, which provides an output signal that controls power to a heating element of a thermal reactor, the spike temperature sensor located in proximity to the heating element and spaced from the process chamber; and
    a second control loop comprising a Model-Based Predictive Controller (MBPC), using a paddle temperature sensor signal as input for the MBPC, which provides as an output a spike temperature control setpoint that is used as input for the conventional controller in the first control loop, the paddle temperature sensor spaced from the heating element and located inside or in proximity to the process chamber, wherein the MBPC is provided with a predictive model representing the behavior of the thermal reactor, the MBPC being configured to calculate an output value based on calculations over a predictive time horizon, using the predictive model.

2. The temperature control system of claim 1, wherein the conventional controller comprises an H∞ controller.

3. The temperature control system of claim 1, wherein the conventional controller comprises a PID controller.

4. The temperature control system of claim 3, wherein the conventional controller comprises a PID controller, said temperature control system further comprising a PID auto-tuning mechanism that adjusts one or more PID parameters as a function of temperature control setpoint and a ramp rate of said temperature control setpoint.

5. The temperature control system of claim 1, further comprising a model identification and data acquisition module that applies closed-loop control using said conventional controller during the execution of a model identification recipe that performs a ramp-up of the thermal reactor to one or more stabilization temperatures.

6. The temperature control system of claim 1, wherein the MBPC is provided with one or more linear dynamic models that characterize thermal response of the thermal reactor.

7. The temperature control system of claim 6, wherein said linear dynamic models characterize said thermal response over one or more temperature sub-ranges.

8. The temperature control system of claim 7, wherein fuzzy control logic is applied to bring about a relatively smooth transition from a first linear dynamic model, operative in a first temperature sub-range, to a second linear dynamic model, operative in a second temperature sub-range.

9. The temperature control system of claim 1, wherein the MBPC comprises a trajectory planner which automatically reduces a specified ramp rate when approaching a constant temperature control setpoint.

10. The temperature control system of claim 1, wherein the output of the MBPC is limited by a static model, said static model describing a relationship between spike temperature and paddle temperature under relatively steady-state conditions.

11. The temperature control system of claim 10, wherein the static model is a fourth order model.

12. The temperature control system of claim 1, wherein a signal from a failed temperature sensor is replaced by a soft-sensor signal computed by a soft-sensor module from at least data obtained from a functioning temperature sensor.

13. The temperature control system of claim 12, wherein said soft-sensor module comprises a dynamic model.

14. A control system comprising:
a first control loop comprising a conventional controller for controlling a plant, said conventional controller configured to receive sensor data from at least one first sensor configured to sense one or more operating parameters of said plant; and
a second control loop comprising a Model-Based Predictive Controller (MBPC), said MBPC configured to provide a control setpoint to said conventional controller, said control setpoint based at least in part on calculations over a predictive time horizon, said MBPC further configured to receive sensor data from at least one second sensor that senses one or more operating parameters of said plant.

15. The control system of claim 14 wherein said conventional controller comprises an H∞ controller.

16. The control system of claim 14 wherein said conventional controller comprises a PID controller.

17. The control system of claim 14 wherein said conventional controller comprises a linear controller.

18. The control system of claim 14 wherein said conventional controller comprises a PID controller, said control system further comprising a PID auto-tuning mechanism configured to adjust control parameters of said PID controller as a function of said control setpoint.

19. The control system of claim 14 wherein said MBPC is provided with one or more linear dynamic models that characterize a desired plant to be controlled.

20. The control system of claim 19 wherein at least one of said one or more linear dynamic models corresponds to a control setpoint sub-range.

21. The control system of claim 14 further comprising fuzzy control logic to bring about a relatively smooth transition from a first linear dynamic model, operative in a first control setpoint sub-range, to a second linear dynamic model, operative in a second control setpoint sub-range.

22. The control system of claim 14 wherein said MBPC comprises a trajectory planner to control a time rate of change of said control setpoint.

23. The control system of claim 14 wherein an output of said MBPC is limited by a static model configured to describe a relationship between said first sensor and said second sensor under steady-state conditions.

24. The control system of claim 23 wherein the static model comprises at least a second-order model.

25. The control system of claim 14, further comprising a soft sensor model to approximate an output of said first sensor from at least data produced by said second sensor.

26. The control system of claim 14, further comprising a soft sensor model to approximate an output of said second sensor from at least data produced by said first sensor.

27. The control system of claim 14, wherein said first sensor comprises a spike temperature sensor in a thermal process reactor, and said second sensor comprises a paddle temperature sensor in said thermal process reactor.

28. A method for controlling a plant, comprising:
providing control inputs to said plant from a first controller, said first controller configured to receive sensor data from at least one first sensor configured to sense one or more operating parameters of said plant; and
providing a control setpoint to said first controller, said control setpoint computed by a Model-Based Predictive Controller configured to receive sensor data from at least one second sensor that senses one or more operating parameters of said plant, said Model-Based Predictive Controller further configured to receive a control process sequence for said plant, and said Model-Based Predictive Controller configured to calculate said control setpoint based at least in part on calculations over a predictive time horizon.

29. The method of claim 28 wherein said first controller comprises an H∞ controller.

30. The method of claim 28 wherein said first controller comprises a PID controller.

31. The method of claim 28 wherein said first controller comprises a linear controller.

32. The method of claim 28 wherein said first controller comprises a PID controller, the method further comprising: adjust control parameters of said PID controller as a function of said control setpoint.

33. The method of claim 28 further comprising calculating one or more linear dynamic models that characterize said plant and providing said one or more linear dynamic models to said Model-Based Predictive Controller.

34. The method of claim 28, further comprising: selecting a plurality of control setpoint sub-ranges, each sub-range corresponding to at least one linear dynamic model.

35. The method of claim 28, further comprising: using fuzzy logic to transition from a first linear dynamic model to a second linear dynamic model.

36. The method of claim 28, further comprising: trajectory planning in said Model-Based Predictive Controller to control a rate of change of said control setpoint.

37. The method of claim 28, further comprising: limiting an output of said Model-Based Predictive Controller according to a static model configured to describe a relationship between said first sensor and said second sensor under relatively steady-state conditions.

38. The method of claim 28, further comprising:
detecting a failure of said first sensor; and
using a soft-sensor model to replace said first sensor, said soft sensor model calculating an estimate of said first sensor using at least data produced by said second sensor.

39. The method of claim 28, further comprising:
detecting a failure of said second sensor; and
using a soft-sensor model to replace said second sensor, said soft sensor model calculating an estimate of said second sensor using at least data produced by said first sensor.

40. The method of claim 28, wherein said control setpoint corresponds to a temperature control setpoint for a thermal process reactor.

41. The method of claim 40, wherein said first sensor corresponds to a temperature sensor.

42. A system for controlling a plant, having a thermal process chamber, the system comprising:
- a first control loop comprising a conventional controller and a first sensor signal as input for the conventional controller, which provides an output signal to control an actuator outside the process chamber to adjust an operating parameter within the process chamber, the first sensor configured to measure the operating parameter, the first sensor located in proximity to the actuator and spaced from the process chamber;
- a second control loop comprising a Model-Based Predictive Controller (MBPC), using a second sensor signal as input for the MBPC, which provides an output signal that is used as input for the conventional controller in the first loop, the second sensor configured to measure the operating parameter, the second sensor spaced from said actuator and located inside or in proximity to the process chamber, the MBPC configured to calculate the output signal based at least in part on calculations over a predictive time horizon using a predictive model.

43. The system of claim 42 wherein the process chamber is a thermal process chamber, the first and second sensors are temperature sensors, the actuator is a heat source and controlling the plant comprises controlling the temperature of the thermal process chamber.

44. A system for controlling a thermal process plant, comprising:
- means for closed-loop feedback control of the plant according to a control setpoint using spike thermocouple sensor feedback; and
- a Model-Based Predictive Controller configured to compute said control setpoint from at least sensor data from at least one paddle thermocouple sensor and a control process sequence, said control setpoint based at least in part on calculations over a predictive time horizon.

* * * * *

UNITED STATES PATENT AND TRADEMARK OFFICE
CERTIFICATE OF CORRECTION

| | | |
|---|---|---|
| PATENT NO. | : 7,006,900 B2 | Page 1 of 1 |
| APPLICATION NO. | : 10/619383 | |
| DATED | : February 28, 2006 | |
| INVENTOR(S) | : Zhenduo et al. | |

It is certified that error appears in the above-identified patent and that said Letters Patent is hereby corrected as shown below:

On Title Page, Item (56) (Foreign Patent Documents) at line 1, after "6/2000" insert --G05D/23/19--.

On Title Page Item (56) (Foreign Patent Documents) at line 1, after "4/2004" insert --H01L/21/22--.

In column 5 at line 19, delete "Pdesi" and insert --Pdset--.

In column 8 at line 23, below "120." and insert --1. Experiment Design and Data Acquisition for Model Identification-- as a heading.

In column 10 at line 49, delete "OR" and insert --QR--.

In column 14 at line 50, above "Based" and insert --6.1 MBPC Algorithm-- as a heading.

In column 21 at line 6, below "active." and insert --8. TC Measurement Failure Detection and Remedy-- as a heading.

Signed and Sealed this

Twenty-seventh Day of March, 2007

JON W. DUDAS
*Director of the United States Patent and Trademark Office*